United States Patent
Li et al.

(10) Patent No.: US 10,732,085 B2
(45) Date of Patent: Aug. 4, 2020

(54) NOTCH TREATMENT METHODS FOR FLAW SIMULATION

(71) Applicant: Bell Helicopter Textron Inc., Fort Worth, TX (US)

(72) Inventors: Xiaoming Li, Colleyville, TX (US); Bogdan R. Krasnowski, Bedford, TX (US); Robert A. Figueroa, Colleyville, TX (US); Robert Wardlaw, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 16/124,762

(22) Filed: Sep. 7, 2018

(65) Prior Publication Data

US 2020/0025661 A1 Jan. 23, 2020

Related U.S. Application Data

(63) Continuation-in-part of application No. 15/079,946, filed on Mar. 24, 2016, now Pat. No. 10,094,751.
(Continued)

(51) Int. Cl.
*G01N 3/62* (2006.01)
*G01N 3/02* (2006.01)
(Continued)

(52) U.S. Cl.
CPC ............... *G01N 3/62* (2013.01); *G01N 3/02* (2013.01); *G06F 30/15* (2020.01); *G06F 2119/18* (2020.01)

(58) Field of Classification Search
CPC .... G01N 3/02; G01N 3/62; C23F 1/14; C23F 1/36; C23C 14/5873
(Continued)

(56) References Cited

U.S. PATENT DOCUMENTS 3,774,443 A   11/1973  Green
3,957,450 A    5/1976  Salt
(Continued)

FOREIGN PATENT DOCUMENTS

EP        3073245 B1    9/2018

OTHER PUBLICATIONS

Wikipedia, The Free Encyclopedia "Electrical Discharged Machining" via https://en.wikipedia.org/wiki/Electrical_discharge_machining ; pp. 1-5; 2019.*
(Continued)

*Primary Examiner* — Binh X Tran
(74) *Attorney, Agent, or Firm* — Timmer Law Group, PLLC

(57) ABSTRACT

A notch treatment method for flaw simulation including providing the specimen with the notch, the notch having a re-melt material layer; isolating the notch; and selectively etching the notch to provide an etched surface of the notch; wherein at least a portion of the re-melt material layer has been removed from the notch. In one aspect, there is provided a notch treatment method for flaw simulation including providing the specimen with the notch, the notch having a re-melt material layer, the specimen includes steel or an alloy thereof; isolating the notch; and selectively etching the notch with a first etching solution and a second etching solution to provide an etched surface on the notch; wherein at least a portion of the re-melt material layer has been removed from the notch.

8 Claims, 19 Drawing Sheets

Related U.S. Application Data

(60) Provisional application No. 62/137,427, filed on Mar. 24, 2015.

(51) Int. Cl.
*G06F 30/15* (2020.01)
*G06F 119/18* (2020.01)

(58) Field of Classification Search
USPC .............................. 216/83, 84, 96, 100, 102
See application file for complete search history.

(56) References Cited

U.S. PATENT DOCUMENTS

| | | | |
|---|---|---|---|
| 3,983,745 | A | 10/1976 | Juusola |
| 4,090,401 | A | 5/1978 | Yamamoto et al. |
| 4,090,489 | A | 5/1978 | Barker |
| 4,116,049 | A | 9/1978 | Barker |
| 4,164,874 | A | 8/1979 | Cassatt |
| 4,299,120 | A | 11/1981 | Barker |
| 4,590,804 | A | 5/1986 | Brull |
| 4,895,027 | A | 1/1990 | Manahan, Sr. |
| 5,078,843 | A | 1/1992 | Pratt |
| 5,079,955 | A | 1/1992 | Eberhardt |
| 5,654,500 | A | 8/1997 | Herron |
| 6,405,600 | B1 | 6/2002 | Matic |
| 6,588,283 | B2 | 7/2003 | Wang |
| 7,230,421 | B2 | 6/2007 | Goldfine |
| 7,320,242 | B2 | 1/2008 | Hoo Fatt |
| 7,480,573 | B2 | 1/2009 | Toyosada |
| 7,533,557 | B1 | 5/2009 | Mott |
| 7,623,973 | B1 | 11/2009 | Wang |
| 7,994,781 | B2 | 8/2011 | Goldfine |
| 8,109,150 | B2 | 2/2012 | Sato |
| 8,176,795 | B2 | 5/2012 | Wang |
| 8,479,588 | B1 | 7/2013 | Simkins, Jr. |
| 8,571,814 | B2 | 10/2013 | Zhao |
| 8,610,883 | B2 | 12/2013 | Lam |
| 8,707,797 | B2 | 4/2014 | Pettit |
| 8,763,229 | B2 | 7/2014 | Reid |
| 8,984,955 | B2 | 3/2015 | Mouri |
| 9,109,979 | B2 | 8/2015 | Dietrich |
| 9,222,865 | B2 | 12/2015 | Khonsari |
| 9,243,985 | B2 | 1/2016 | Khonsari |
| 9,280,620 | B2 | 3/2016 | Amann |
| 9,383,303 | B2 | 7/2016 | Bruchhausen |
| 9,423,330 | B2 | 8/2016 | Mary |
| 9,464,975 | B2 | 10/2016 | Esposito |
| 9,476,815 | B2 | 10/2016 | Khonsari |
| 9,573,284 | B2 | 2/2017 | Thwing |
| 9,702,798 | B1 | 7/2017 | Kim |
| 9,841,364 | B2 | 12/2017 | Chen |
| 10,094,751 | B2 | 10/2018 | Li et al. |
| 2004/0118813 | A1* | 6/2004 | Lai .................. B44C 1/227 216/84 |
| 2008/0289178 | A1* | 11/2008 | Nashner ............ H05K 3/445 29/852 |
| 2009/0315540 | A1 | 12/2009 | Goldfine |
| 2011/0005329 | A1 | 1/2011 | Matsuoka |
| 2015/0114697 | A1 | 4/2015 | Murrell |
| 2016/0061688 | A1 | 3/2016 | Van Wittenberghe |
| 2016/0282244 | A1 | 9/2016 | Li et al. |
| 2016/0349161 | A1 | 12/2016 | Chen |
| 2019/0062885 | A1* | 2/2019 | Prasannavenkatesan .................... C25D 11/12 |

OTHER PUBLICATIONS

Office Action dated Oct. 6, 2017, by the USPTO, re U.S. Appl. No. 15/079,964.
Notice of Allowance dated Jun. 6, 2018, by the USPTO, re U.S. Appl. No. 15/079,964.
Corrected Notice of Allowance dated Aug. 8, 2018, by the USPTO, re U.S. Appl. No. 15/079,964.
European Search Report, dated Nov. 24, 2016, by the EPO, re EP Patent App No. 16162437.
EP Communication under Rule 71(3) EPC, dated May 18, 2018, by the EPO, re EP Patent App No. 16162437.4.
EP Decision to Grant, dated Aug. 17, 2018, by the EPO, re EP Patent App No. 16162437.4.
Brett L. Anderson, et al; Evaluation and Verification of Advanced Methods to Assess Multiple-Site Damage of Aircraft Structure; Oct. 2004; URL: https://web.archive.org/web/20111018161217/http://airportaircraftsafetyrd.tc.faa.gov/Programs/agingaircraft/Structural/reports/04-42-Vol-I.pdf, (Nov. 18, 2016).
K.A. Zakaria, et al.; Fractogrpahy Analysis of A16061 Under Fatigue Spectrum Loadings; Engineering e-Transaction, vol. 7, No. 1, Jun. 2012, pp. 28-33.
ASTM International, Standard Test Method for Measurement of Fatigue Crack Growth Rates, Apr. 2008, 46 pages, Pennsylvania, US.

* cited by examiner

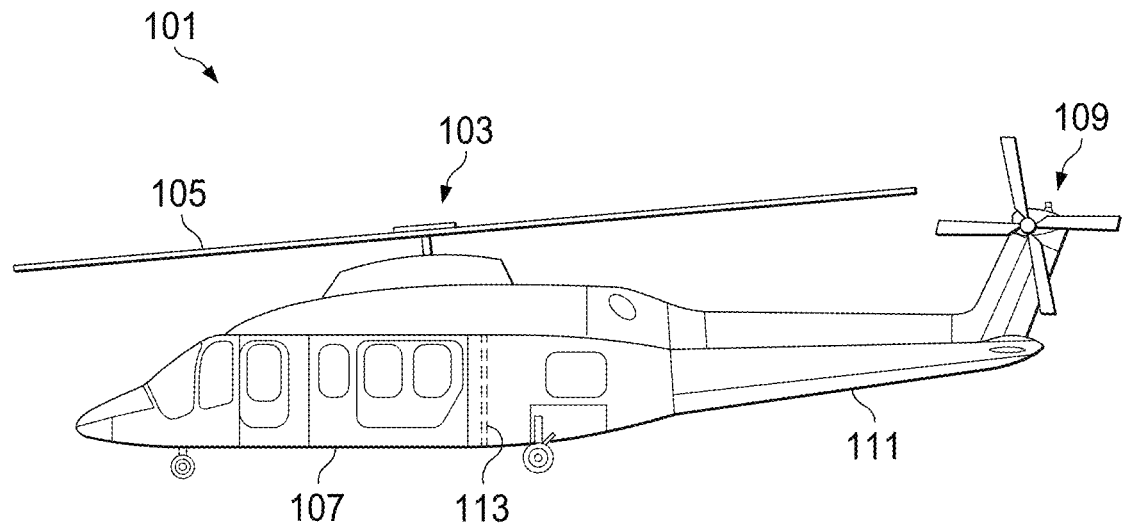
FIG. 1
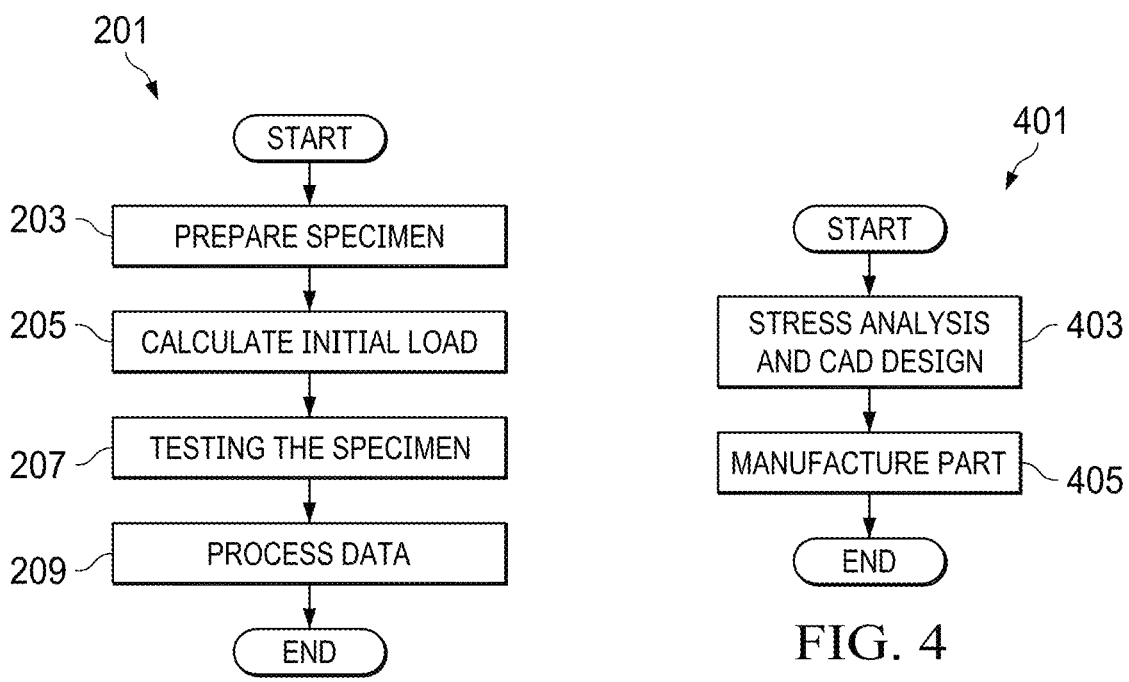
FIG. 2
FIG. 4

FIG. 3

| $c_1/c_2$ | $c_1/b_1$ | $c_2/b_2 = 0.0$ | | $c_2/b_2 = 0.1$ | | $c_2/b_2 = 0.2$ | | $c_2/b_2 = 0.5$ | | $c_2/b_2 = 0.8$ | | $c_2/b_2 = 1.0$ | |
|---|---|---|---|---|---|---|---|---|---|---|---|---|---|
| | | a-tip | c-tip | a-tip | c-tip | a-tip | c-tip | a-tip | c-tip | a-tip | c-tip | a-tip | c-tip |
| 0.0 | 0.0 | 0.996 | 1.931 | 1.000 | 2.024 | 0.996 | 1.907 | 1.003 | 1.906 | 1.000 | 1.870 | 1.004 | 1.846 |
| | 0.1 | 1.062 | 1.930 | 1.068 | 1.973 | 1.069 | 1.924 | 1.069 | 1.795 | 1.057 | 1.705 | 1.055 | 1.645 |
| | 0.2 | 1.191 | 2.009 | 1.196 | 2.021 | 1.200 | 2.005 | 1.191 | 1.914 | 1.182 | 1.854 | 1.174 | 1.814 |
| | 0.5 | 1.766 | 2.817 | 1.786 | 2.874 | 1.816 | 2.909 | 1.935 | 3.034 | 2.070 | 3.171 | 2.187 | 3.278 |
| | 0.8 | 2.524 | 4.427 | 2.606 | 5.038 | 2.715 | 5.389 | 3.291 | 6.605 | 4.126 | 7.951 | 4.832 | 8.979 |
| | 1.0 | 3.140 | 5.955 | 3.278 | 7.366 | 3.471 | 8.289 | 4.635 | 11.871 | 6.432 | 15.372 | 7.925 | 17.706 |
| 0.2 | 0.0 | 1.037 | 1.280 | 1.041 | 1.285 | 1.043 | 1.291 | 1.070 | 1.330 | 1.102 | 1.390 | 1.128 | 1.441 |
| | 0.1 | 1.078 | 1.311 | 1.083 | 1.318 | 1.087 | 1.322 | 1.116 | 1.355 | 1.145 | 1.406 | 1.169 | 1.452 |
| | 0.2 | 1.157 | 1.374 | 1.161 | 1.380 | 1.169 | 1.388 | 1.207 | 1.420 | 1.240 | 1.470 | 1.268 | 1.513 |
| | 0.5 | 1.515 | 1.752 | 1.536 | 1.787 | 1.571 | 1.833 | 1.732 | 1.993 | 1.944 | 2.243 | 2.124 | 2.448 |
| | 0.8 | 2.031 | 2.498 | 2.098 | 2.663 | 2.196 | 2.832 | 2.749 | 3.528 | 3.623 | 4.603 | 4.378 | 5.491 |
| | 1.0 | 2.475 | 3.286 | 2.578 | 3.585 | 2.749 | 3.931 | 3.790 | 5.340 | 5.523 | 7.514 | 7.026 | 9.311 |
| 0.4 | 0.0 | 1.073 | 1.173 | 1.077 | 1.177 | 1.082 | 1.183 | 1.130 | 1.244 | 1.201 | 1.314 | 1.254 | 1.365 |
| | 0.1 | 1.094 | 1.196 | 1.097 | 1.201 | 1.104 | 1.206 | 1.161 | 1.267 | 1.233 | 1.343 | 1.289 | 1.398 |
| | 0.2 | 1.131 | 1.241 | 1.135 | 1.246 | 1.147 | 1.257 | 1.227 | 1.337 | 1.306 | 1.417 | 1.375 | 1.488 |
| | 0.5 | 1.317 | 1.488 | 1.339 | 1.521 | 1.378 | 1.567 | 1.577 | 1.749 | 1.865 | 2.072 | 2.117 | 2.349 |
| | 0.8 | 1.636 | 1.985 | 1.691 | 2.069 | 1.780 | 2.198 | 2.318 | 2.781 | 3.239 | 3.816 | 4.066 | 4.723 |
| | 1.0 | 1.941 | 2.504 | 2.015 | 2.638 | 2.167 | 2.861 | 3.111 | 3.972 | 4.813 | 5.875 | 6.355 | 7.559 |
| 0.5 | 0.0 | 1.086 | 1.158 | 1.090 | 1.160 | 1.097 | 1.165 | 1.150 | 1.220 | 1.235 | 1.302 | 1.308 | 1.381 |
| | 0.1 | 1.102 | 1.179 | 1.106 | 1.180 | 1.113 | 1.185 | 1.178 | 1.245 | 1.271 | 1.339 | 1.350 | 1.424 |
| | 0.2 | 1.130 | 1.211 | 1.134 | 1.217 | 1.147 | 1.228 | 1.238 | 1.310 | 1.345 | 1.417 | 1.439 | 1.511 |
| | 0.5 | 1.272 | 1.414 | 1.294 | 1.446 | 1.335 | 1.492 | 1.550 | 1.684 | 1.879 | 2.045 | 2.161 | 2.355 |
| | 0.8 | 1.546 | 1.827 | 1.596 | 1.899 | 1.684 | 2.018 | 2.224 | 2.574 | 3.169 | 3.609 | 4.010 | 4.516 |
| | 1.0 | 1.801 | 2.260 | 1.871 | 2.368 | 2.021 | 2.558 | 2.931 | 3.568 | 4.595 | 5.380 | 6.163 | 7.059 |
| 1.0 | 0.0 | 1.138 | 1.138 | 1.142 | 1.141 | 1.145 | 1.144 | 1.192 | 1.192 | 1.343 | 1.343 | 1.523 | 1.523 |
| | 0.1 | 1.141 | 1.142 | 1.144 | 1.144 | 1.154 | 1.152 | 1.220 | 1.220 | 1.399 | 1.399 | 1.601 | 1.609 |
| | 0.2 | 1.144 | 1.145 | 1.152 | 1.154 | 1.172 | 1.172 | 1.267 | 1.267 | 1.486 | 1.486 | 1.683 | 1.685 |
| | 0.5 | 1.198 | 1.232 | 1.220 | 1.261 | 1.267 | 1.309 | 1.547 | 1.547 | 2.056 | 2.056 | 1.801 | 2.514 |
| | 0.8 | 1.364 | 1.413 | 1.399 | 1.470 | 1.486 | 1.565 | 2.056 | 2.075 | 3.171 | 3.171 | 2.555 | 4.162 |
| | 1.0 | 1.481 | 1.615 | 1.545 | 1.686 | 1.685 | 1.801 | 2.514 | 2.555 | 4.162 | 4.190 | 4.196 | 5.977 |

301

NOTCH TREATMENT METHODS FOR FLAW SIMULATION

CROSS-REFERENCE TO RELATED APPLICATIONS

This application claims priority to and is a continuation-in-part patent application of U.S. patent application Ser. No. 15/079,946, filed Mar. 24, 2016, which claims priority to U.S. provisional application No. 62/137,427, filed Mar. 24, 2015, which are hereby incorporated by reference for all purposes as if fully set forth herein.

BACKGROUND

Technical Field

The embodiments of the present disclosure relate to treatment methods for a notch on a specimen, such as a specimen used to determine damage tolerance allowables for an aircraft structure.

Description of Related Art

The United States Federal Aviation Federation (FAA) established airworthiness standards for aircraft such as airplanes and rotorcraft and provides airworthiness approval for aircraft, aircraft engines, propellers and related articles which certifies that they conform to an approved design and are in a condition for safe operation. More specifically, part 29 of 14 CFR regulations is directed to airworthiness standards for transport rotorcraft, which includes section § 29.571 that is directed to fatigue tolerance evaluation of metallic structure. This section details fatigue tolerance substantiation of a principal structure element (PSE) of a transport category rotorcraft. In addition, this section requires testing and evaluation of manufacturing flaws and operational defects ("defects"). Crack initiation from the defect as a failure criterion is one of the seven methods to show compliance.

Conventional methods of determining damage tolerance allowables for an aircraft structure can include developing and testing specimens with various types and configurations of defects so as to cover all probable manufacturing flaws and operational defects. With these methods, either multiple specimens having various types and configurations of defects are used which can be laborious to prepare and test and requires extensive analysis using a complicated testing matrix; or various types and configurations of defects are simply represented by a crack, of which fatigue tolerance analysis can result in the designing of aircraft structures with too much conservatism, thus being heavier than actually necessary.

There is a need for an improved method of treating a defect (e.g., a notch) on a specimen. In particular, there is a need for an improved method of treating a notch on a specimen, adequately representing a defect, used for fatigue tolerance substantiation.

SUMMARY

In a first aspect, there is a notch treatment method for flaw simulation, including providing a specimen with a notch, the notch having a re-melt material layer; isolating the notch; and selectively etching the notch to provide an etched surface of the notch; wherein at least a portion of the re-melt material layer has been removed from the notch.

In an embodiment, the step of providing the specimen with the notch includes generating the notch on the specimen by electrical discharge machining.

In an embodiment, the re-melt material layer is disposed on at least one of a root notch and a lateral side wall of the notch.

In some embodiments, the specimen has a square cross-sectional portion and the notch is located in a corner of the square cross-sectional portion.

In another embodiment, the specimen is at least one of the following: aluminum, titanium, magnesium, steel, or an alloy thereof.

In an embodiment, the step of isolating the notch includes placing an isolation layer with a slot onto the specimen such that the slot exposes the notch.

In an exemplary embodiment, the step of isolating the notch further includes placing a dam on the isolation layer to form a notch area and a peripheral area on the specimen; wherein the notch area is disposed at least partially around the notch.

In a particular embodiment, the step of placing a dam on the isolation layer includes forming a moldable cylinder.

In an embodiment, the step of selectively etching the notch includes applying an etching solution to the notch area to form the etched surface on the notch.

In an illustrative embodiment, the etching solution includes at least one of the following: a sodium hydroxide solution, a Kroll's etchant solution, an acetic acid solution, an aqua regia solution, a Fry's reagent solution, and a nital solution.

In an embodiment, the specimen includes aluminum or an alloy thereof; and the etching solution includes a sodium hydroxide solution.

In still yet another embodiment, the specimen includes titanium or an alloy thereof; and the etching solution includes a Kroll's etchant solution.

In an embodiment, the specimen includes magnesium or an alloy thereof; and the etching solution includes an acetic acid solution.

In another embodiment, the method further includes removing the isolation layer and the dam from the specimen; and cleaning the specimen to remove the etching solution.

In an embodiment, at least a portion of the etched surface on the notch includes microcracks.

In a second aspect, there is a notch treatment method for flaw simulation, including providing a specimen with a notch, the notch having a re-melt material layer, the specimen includes steel or an alloy thereof; isolating the notch; and selectively etching the notch with a first etching solution and a second etching solution to provide an etched surface on the notch; wherein at least a portion of the re-melt material layer has been removed from the notch.

In an embodiment, the step of isolating the notch includes placing an isolation layer with a slot onto the specimen such that the slot exposes the notch; and placing a dam on the isolation layer to form a notch area and a peripheral area on the specimen; wherein the notch area is disposed at least partially around the notch.

In a particular embodiment, the steel is a stainless steel alloy; the first etching solution includes an aqua regia solution; and the second etching solution includes a Fry's reagent solution.

In an illustrative embodiment, the steel is a high strength steel alloy; the first etching solution includes an aqua regia solution; and the second etching solution includes a nital solution.

In an embodiment, the method further includes removing the isolation layer and the dam from the specimen; cleaning the specimen to remove the first etching solution and the second etching solution; and applying a heat treatment to the specimen.

In an embodiment, at least a portion of the etched surface on the notch includes microcracks.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

FIG. 1 is a side view of a rotorcraft, according to one example embodiment;

FIG. 2 is a schematic view of a method of determining damage tolerance allowables, according to one example embodiment;

FIG. 3 is a table, according to one example embodiment;

FIG. 4 is a schematic view of a method of manufacturing a part, according to one example embodiment;

DESCRIPTION OF THE PREFERRED EMBODIMENT

Figure 5:
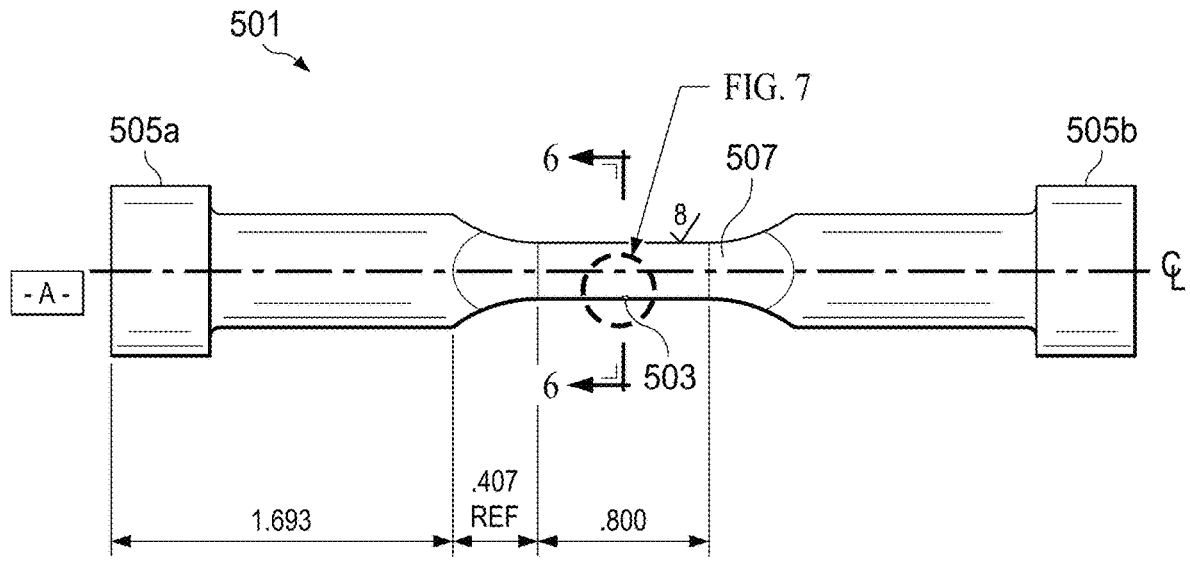
FIG. 5 is a side view of a specimen, according to one example embodiment.
Figure 6:
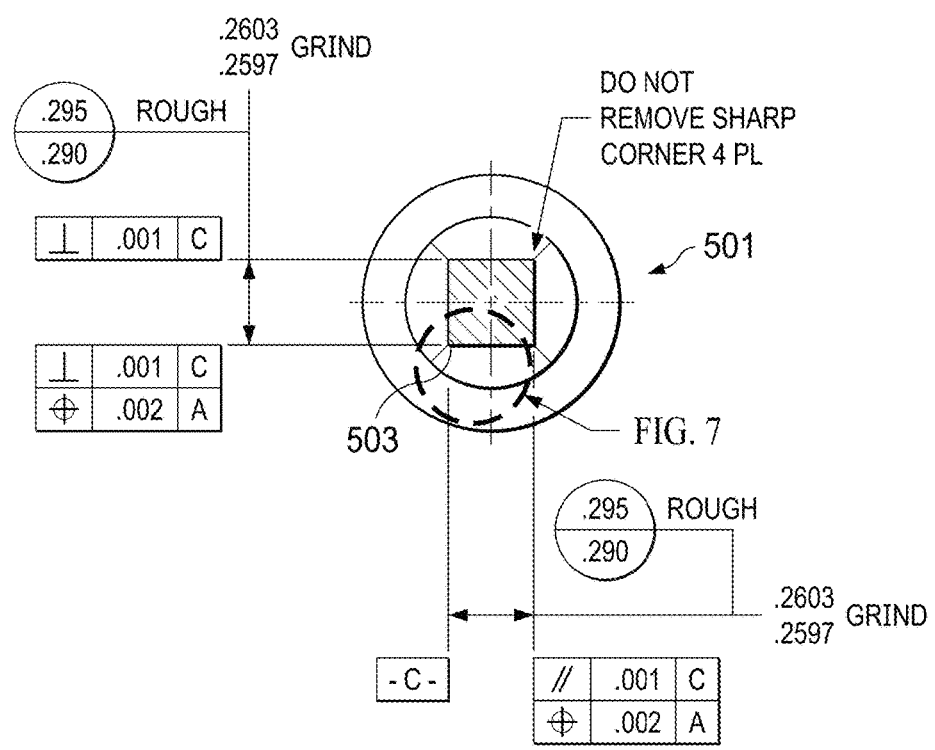
FIG. 6 is a cross-section view take at section lines 6-6 in FIG. 5, according to one example embodiment.

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Damage tolerance allowables are essential for the damage tolerance design of rotorcraft structures, such as dynamic parts. When an aircraft is designed to certain usage and load conditions, the combination of those conditions flow down to the structures and translate into a certain stress level that depends upon the material composition of the parts and the detail design of the parts. A comparison of that stress level of the part to the damage tolerance allowables determines whether the part can satisfy the damage tolerance requirements with the particular design. If the stress level exceeds the damage tolerance allowables, the part requires re-design to reduce the stress level of the part, which typically causes an increase in the weight of the part or a decrease in the overall load and usage capability of the aircraft.

If the damage tolerance allowables are overly conservative, the stress level of the part would have to be designed to meet the overly conservative damage tolerance criteria, which would cause the size (and weight) of the part to increase to meet the given usage and load requirements of the aircraft. Alternatively, the usage and load capabilities of the aircraft would need to be lowered to maintain any weight requirements.

Conventional ideology of determining damage tolerance requirements includes introduction of a crack in a critical location of a structure and analyzing the growth of that crack due to the aircraft usage and loading. Conventionally, in order to satisfy damage tolerance requirements for high stress high frequency loaded rotorcraft structures, the initial crack must not be allowed to grow. The term that describes this "no growth" phenomena is called "threshold value." Since the threshold values for small cracks were difficult to determine in the laboratory, the conventional method (ASTM E647) determines threshold values obtained by testing the long crack growth under decreasing loading until the crack stops growing. Based on threshold values obtained in such approximate ways, the small crack no-growth damage tolerance allowables are derived with further approximations and knockdowns. Multiple steps of approximations and derivations result in conservatism and variability, thus generating overly conservative damage tolerance allowables.

The present disclosure includes methods and systems of generating no-growth damage tolerance allowables for structures, which allow for higher stress level in the damage tolerant designed part with less weight while meeting the usage and load requirements of the aircraft. Certain embodiments include methods and systems of directly obtaining no-growth damage tolerance allowables for aircraft structure, the allowables being approximately 15%-30% higher than allowables produced by the conventional ASTM E647 method. Moreover, a 15%-30% higher allowable can equate to an approximately 15%-30% weight savings of the aircraft structure. Furthermore, certain embodiments of the methods and systems of directly obtaining no-growth damage tolerance allowables for aircraft structure may prevent the necessity of full scale aircraft structure testing that may otherwise be required for certification. The method of the present application is a coupon specimen testing method that generates threshold stress data for fatigue crack initiation in a metallic material. In one embodiment, "threshold" can be the fatigue stress state {mean stress, oscillatory stress}, below which a flaw or a crack in a metallic material will not grow. As such, threshold stress may also be called "no-growth threshold."

In one embodiment, the test method generates threshold stress data for crack initiation. The test specimen can be a square-bar coupon, cyclically loaded along the axis. Each coupon specimen contains a notch at a corner of the center-plane of the specimen to simulate a flaw.

Figure 23:
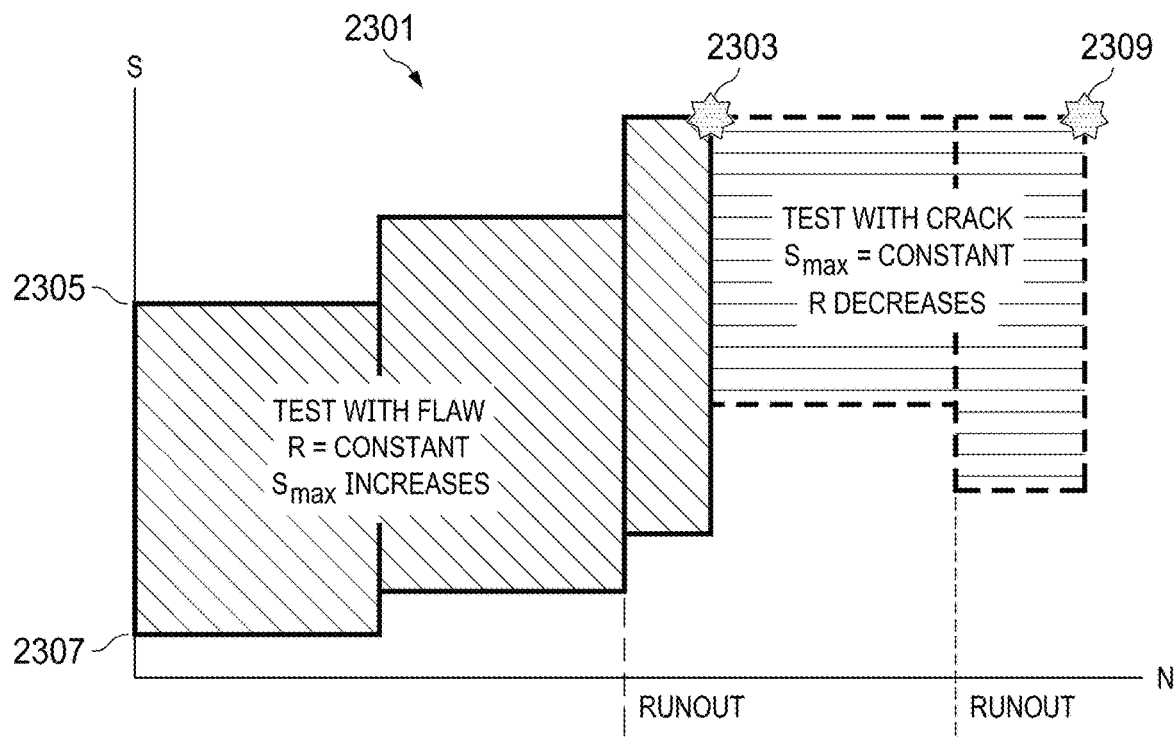
FIG. 23 is a graphical representation of a testing method, according to one example embodiment.

Referring to FIG. 23, a graphic 2301 illustrates how the method derives the threshold stress. The test starts at required stress ratio R with an initial load max 2305 and initial load min 2307. If crack initiation occurs and the criterion $\Delta a_c/\Delta N \leq 4\times 10^{-9}$ in/cycle is met, this load is the threshold fatigue load, from which the threshold stress of the material can be obtained. Otherwise if with that load the number of cycle reaches $N_0=1,000,000$ without crack initiation, the load will be bumped up to a higher level and the test will be repeated. The number of 1,000,000 cycles can be chosen because it meets the threshold criterion with the maximum presumed crack initiation (0.004-in) even if it does not happen. This way the necessary conservatism of the data is ensured. This process can be repeated until crack initiation occurs at an occurrence 2303 and the threshold criterion is not met. In this case, the previous load level will be used for no-growth threshold stress of the flaw.

Once the crack initiation occurs at the occurrence 2303, the testing continues and turns into determination of threshold stress for a crack, which becomes evident by a crack growth occurrence 2309. The testing maintains the last maximum load for the test with the flaw to avoid overload effect, but changes the minimum load. The same process as testing with flaw is used and may need to be repeated until the threshold stress is achieved for the crack.

Figure 24:
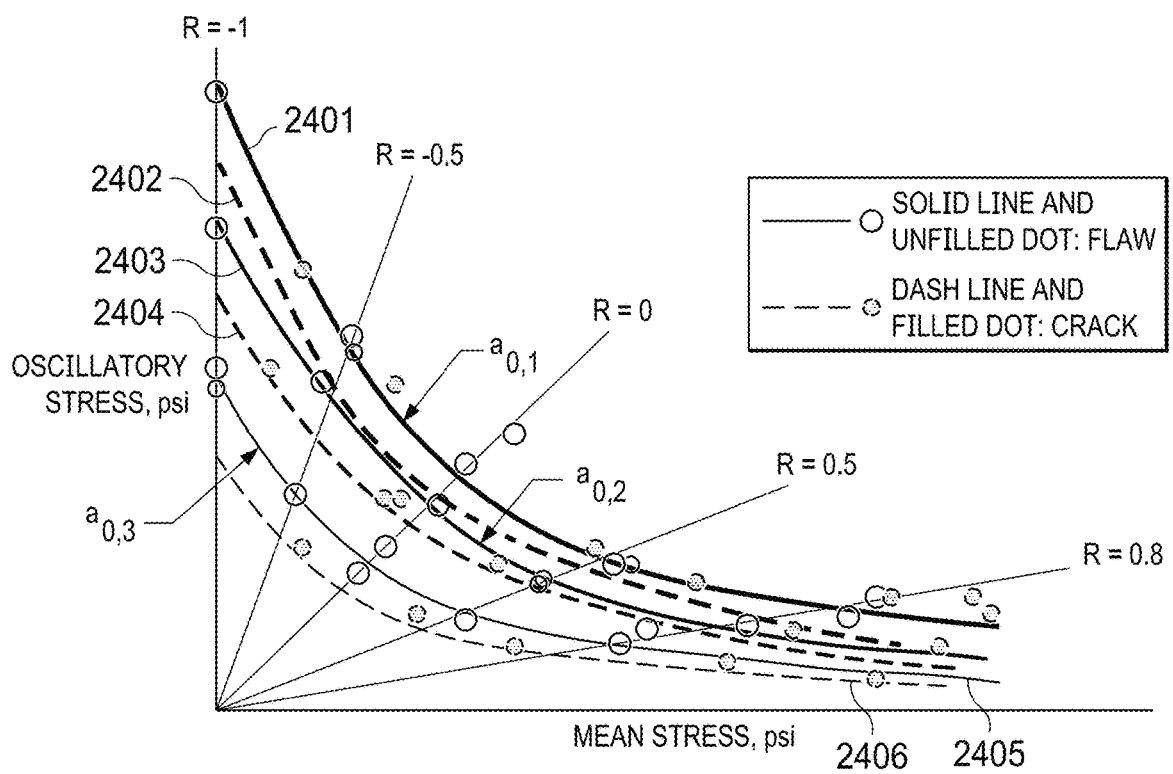
FIG. 24 is a graphical representation of threshold stress data, according to one example embodiment.

Referring now also to FIG. 24, the tests can be performed with various stress ratios R for the coupons of same notch size $a_0$, which together generate a threshold stress curves $\{s_{mean}, s_{osc}\}$ for notch length $a_{0,1}$. In same way, the threshold stress curves can be achieved for various flaw sizes, shown as solid lines 2401, 2403, 2405 in FIG. 24. Similarly, the data obtained for various crack lengths can also form the threshold stress curves for no-growth of crack(s), shown as dotted lines 2402, 2404, 2406 in FIG. 24. Regarding FIG. 24, exemplary threshold stress data generated via the test method is illustrated, wherein $(a_{0,1} < a_{0,2} < a_{0,3})$.

Referring now to FIG. 1 in the drawings, a rotorcraft 101 is illustrated. Rotorcraft 101 can have a rotor system 103 with a plurality of rotor blades 105. The pitch of each rotor blade 105 can be manipulated in order to selectively control direction, thrust, and lift of rotorcraft 101. Rotorcraft 101 can further include a fuselage 107, anti-torque system 109, and an empennage 111. The structure of rotorcraft 101 can include a variety of airframe structures, such as bulkheads, ribs, longerons, stringers, keels, skins, spars, to name a few examples. A bulkhead 113 is labeled for illustrative purposes.

The methods and systems of the present disclosure relate to determining damage tolerance ("DT") allowables for a structure, such as an aircraft structure. It should be appreciated that rotorcraft 101 is merely illustrated as one of many different types of aircraft whose structure can be analyzed and designed using the methods and systems of the present disclosure. Furthermore, other aircraft can include, fixed wing aircraft, hybrid aircraft, unmanned aircraft, tiltrotor aircraft, to name a few examples.

Referring now also to FIG. 2, a method 201 of directly determining damage tolerance allowables is schematically illustrated. In one embodiment, method 201 is a test method for determining no-growth threshold stress for a flaw or a crack in a metallic component. Applicable metals can include at least one of the following: aluminum, titanium, magnesium, steel, or an alloy thereof, to name a few examples. The conventional ASTM E647 method derives crack growth threshold ($\Delta K_{TH}$) from the derived crack growth rate curve (da/dN vs. $\Delta K$) that is based on crack growth testing a-N data, where K is stress intensity factor (SIF). Once $\Delta K_{TH}$ is derived, it is further converted into no-growth threshold fatigue stress. As a contrast, the direct test method 201 can generate a fatigue stress data in which a flaw or a crack will not grow. In this way, the no-growth damage tolerance allowables can be determined based on the directly obtained fatigue test stress data.

Method 201 can include a step 203 of preparing a specimen, a step 205 of calculating an initial load, a step 207 of testing the specimen, and a step 209 of processing data. Each of these steps are described in further detail herein.

Alternating or Oscillatory Stress ($\sigma_{osc}$): The alternating stress is one half of the stress range during a stress cycle.

Maximum Stress ($\sigma_{max}$): The highest algebraic value of stress in the stress cycle, tensile stress being considered positive and compressive stress negative.

Mean Stress (Steady Stress, $\sigma_{mean}$): The algebraic mean of the maximum and minimum stress in one stress cycle. A tensile stress is considered positive.

Minimum Stress ($\sigma_{min}$): The lowest algebraic value of the stress in the stress cycle.

Scatter: This term usually refers to the scatter of test points which define a $\sigma_{osc}$-$\sigma_{mean}$ curve.

Stress Cycle (N): A stress cycle is the smallest section of the stress-time function which can be repeated periodically and identically.

Stress Ratio (R): The ratio of minimum stress divided by maximum stress.

Crack Initiation: In one example embodiment, crack initiation is when a pre-crack appears beyond 0.001-inch but shorter than 0.004-inch (0.001-inch≤$\Delta c_{i,o}$≤0.004-inch), indicated by the potential drop method (PDM) during testing. i=1, 2, the two sides of gauge of the corner crack test coupon on which notch (and crack) can be observed.

Initial Flaw Size ($c_{i,o}$): Initial flaw size is defined as one of the design requirements for a DT part in which a flaw of the initial flaw size does not grow.

Initial Crack Size ($c_{i,c}$): In one example embodiment, the initial crack size is the size of crack initiation.

Crack Growth Increment ($\Delta C_i$): In one example embodiment, the crack growth increment is the length of crack initiation.

Initial Load ($P_o$): A load the test starts with.

Final Load ($P_C$): The load at which the notch starts to grow.

Test and Testing Block: A Test is an iterating process of stepped load with one time set up of testing frame. In one example embodiment, a Testing Block is counted as a 1,000,000 cycle run of fatigue test except the last block for which the flaw/crack starts to grow before it reaches the 1,000,000 cycles.

PD or PDM: Potential drop or potential drop method. A method to indicate occurrence of crack growth by monitoring voltage change of a special detection system.

Referring now also to FIGS. 5-8, a specimen 501 which can also be referred to herein as "Ks Bar", is illustrated. In one example embodiment, specimen 501 is a bar coupon for an axially loaded fatigue test that has a gauge of square cross-section and a corner notch 503 on the middle plane of the specimen 501. As shown in FIG. 5, the specimen 501 is symmetric about a center-plane.

Method 201 generates crack initiation data with using one or more specimens 501, each with a corner notch 503 at the center-plane of the specimen 501. In one implementation, three notch sizes can be utilized. Example nominal notch sizes for general metal-forming materials are 0.005-inch, 0.010-inch, and 0.015-inch, measured on each side of the corner of the specimen 501. Example nominal notch sizes for casting materials are 0.015-inch, 0.025-inch, and 0.050-inch, also measured on each side of the specimen 501. For each notch size, twelve coupons can be used to support the tests at five stress ratios, viz. R=−1, −0.5, 0.05, 0.5, 0.8. Among these five stress ratios, R=0.05 is primary and at least four specimens 501 can be used to support the R=0.05 tests. For the other four stress ratio tests, at least two specimens 501 can be used for each stress ratio tests. Table 1 lists an example specimen matrix for the requirements of test specimens, i.e., thirty-six coupons. In addition, four un-notched spare specimens 501 can be used to mitigate unexpected events, resulting in a total of forty coupons that can be used in the example test program. It should be appreciated that the exact quantity of specimens 501 used in method 501 is implementation specific; furthermore, the quantity of specimens 501 described herein are for exemplary purposes and are not intended to be restrictive.

TABLE 1

Specimen Matrix

| $C_{i,o}$ (in) | | Stress Ratio | | | | | |
|---|---|---|---|---|---|---|---|
| Wrought | Casting | −1 | −0.5 | 0.05 | 0.5 | 0.8 | Total Spare |
| | | Specimen Number | | | | | |
| 0.005 | 0.015 | | | | | | TBD |
| 0.010 | 0.025 | | | | | | TBD |
| 0.015 | 0.050 | | | | | | TBD |
| | | | | | | | TBD TBD |
| | | | | | | | Total TBD |

Depending on the probable flaw (or crack) orientation in a structural part for which the threshold stress data of the material is desired, the specimen 501 is machined from the material direction so that the corner notch 503 of the specimen 501 is of the same material orientation as in the structural part.

For instance, a probable flaw in the S-T (or R-C) material orientation is possible in a structural part and no-growth threshold stress data is needed. For wrought materials, the axial direction of the specimen 501 can align with the thickness direction if it is made from a thick plate, or can align with the radius direction if it is made from a round bar. With this alignment, the corner notch 503 of a specimen 501 is in the S-T or R-C orientation. There may not be a specific requirement on alignment of the specimen 501 with respect to the sand casting material since the grain direction is not significant in such a case. The length of the specimen 501 can be any implementation specific length; however, one example length is approximately four inches. Another example length is five inches. The head buttons 505a and 505b of the specimen 501 are designed for the axial load application, for which the perpendicularity of the shoulders to the axis of the specimen 501 is desired during the test.

Figure 7:
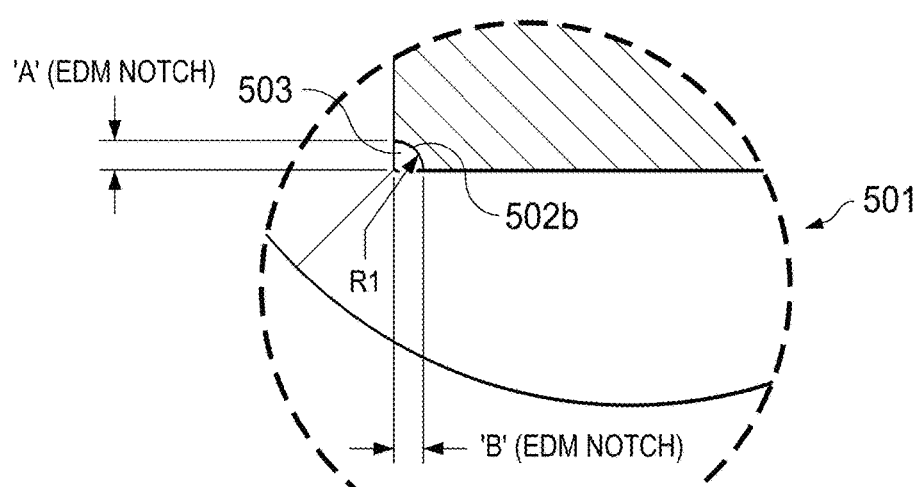
FIG. 7 is a detail view taken from FIG. 6, according to one example embodiment.
Figure 8:
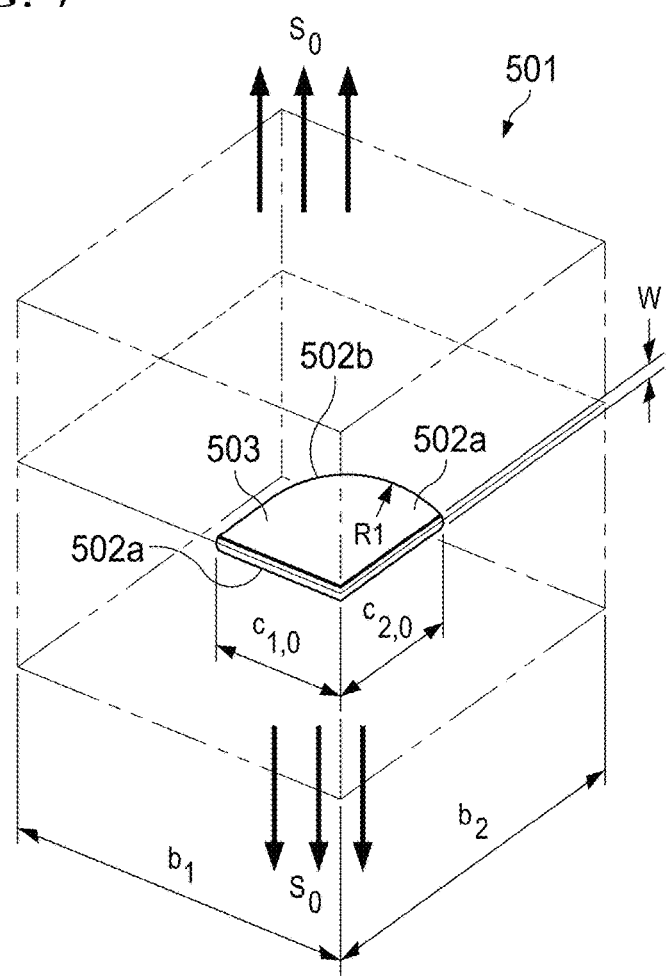
FIG. 8 is a stylized perspective view of a specimen, according to one example embodiment.

In the example embodiment, a gauge section 507 is of square cross-section. The center cross-section of the gauge section 507 is the mid-plane (also symmetric plane) of the specimen 501, on which a notch 503 is induced at a corner, as shown at least in FIGS. 7 and 8. The notch 503 includes a pair of lateral side walls 502a and a root 502b disposed therebetween. In one example embodiment, the nominal dimensions of corner notch 503 is $c_{i,o}$=0.05, 0.010, or 0.015 for metal-forming materials and 0.015, 0.025, or 0.050 for casting materials, where i=1 (Side 1) and 2 (Side 2), measured from the corner point of the specimen 501 to the tip of the notch 503 on each side of the gauge, as shown in FIG. 8. In one example embodiment, the width W of the corner notch 503 is 0.003-inch. It is desired that the root 502b of the corner notch 503 (also called notch front) have a curved portion R1 as shown in FIGS. 7 and 8.

The material of the specimen 501 should be the same as the material as the structural part of which the damage tolerance allowables are being determined. For example, the material of the specimen 501 should not only be of the same material, but also have the same material conditions, such as ultimate tensile strength (UTS), heat-treatment, hardening condition, and material form, as the structural part of which the damage tolerance allowables are being determined.

In one example embodiment, notch 503 is generated using an electrical discharge machining (EDM) method; however, it should be appreciated that other methods of creating notch 503 may be used, such as sawing, broaching, milling, machining with microtools, or laser cutting, for example, as long as a notch can be created with a curved portion R1. The step of generating the notch 503 can include removing a portion of the material from the corner of the gauge section 507 of the specimen 501 to form the notch 503 having the lateral side walls 502a and root 502b disposed therebetween. During the removing step as the material is cleared away (e.g., burned or cut away) from the corner to form the notch 503 a portion of the remaining material in the root 502b and/or side walls 502a of the notch 503 is heated, softened, and then hardened, which forms a re-melt material layer 504 thereon. The re-melt material layer 504 has a high hardness due to being heated, softened, and then hardened during the generating a notch step. For example, but not limitation, the re-melt material layer 504 can be caused by the high temperatures that occur during the EDM method.

Figure 19:
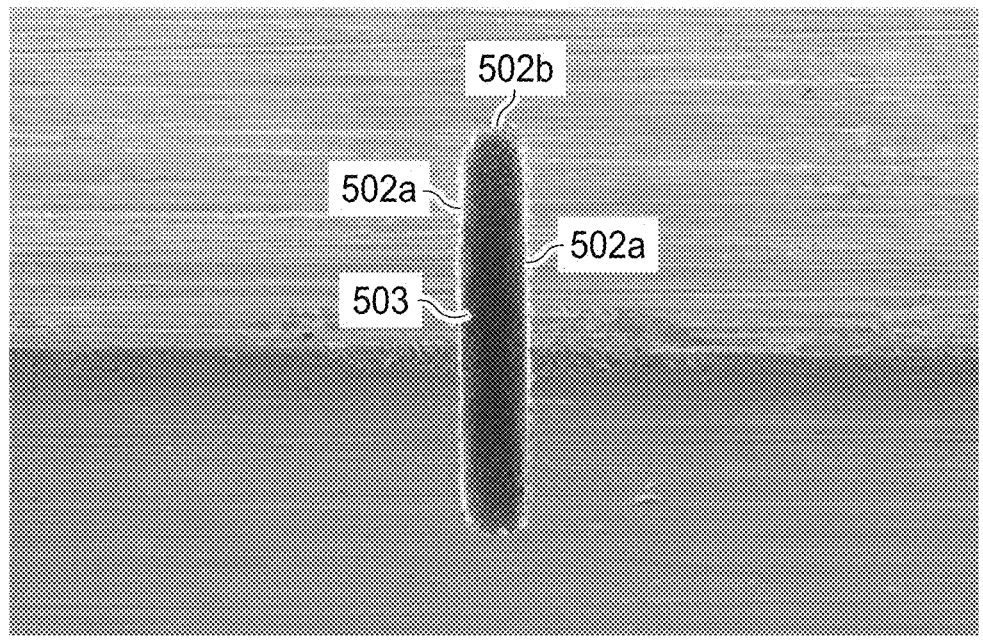
FIG. 19 a view of an EMD corner notch, according to one example embodiment.
Figure 20:
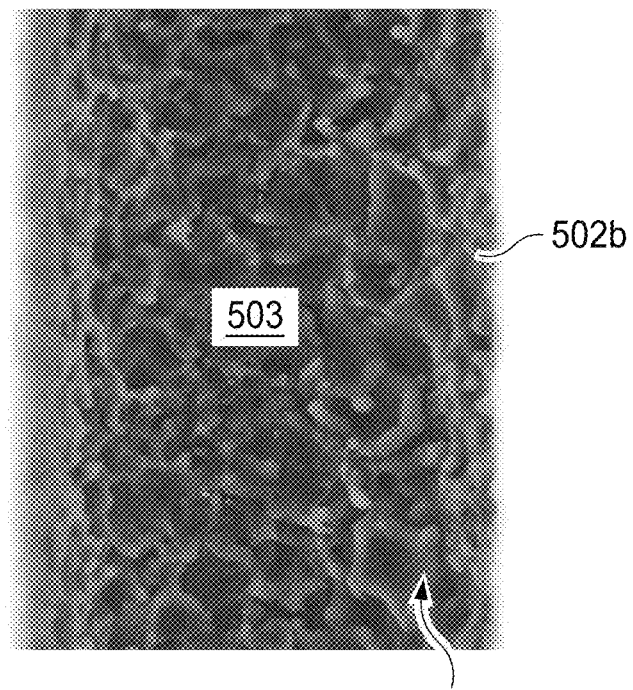
FIG. 20 a close up view of an EMD corner notch before chemical modification, according to one example embodiment.
Figure 21:
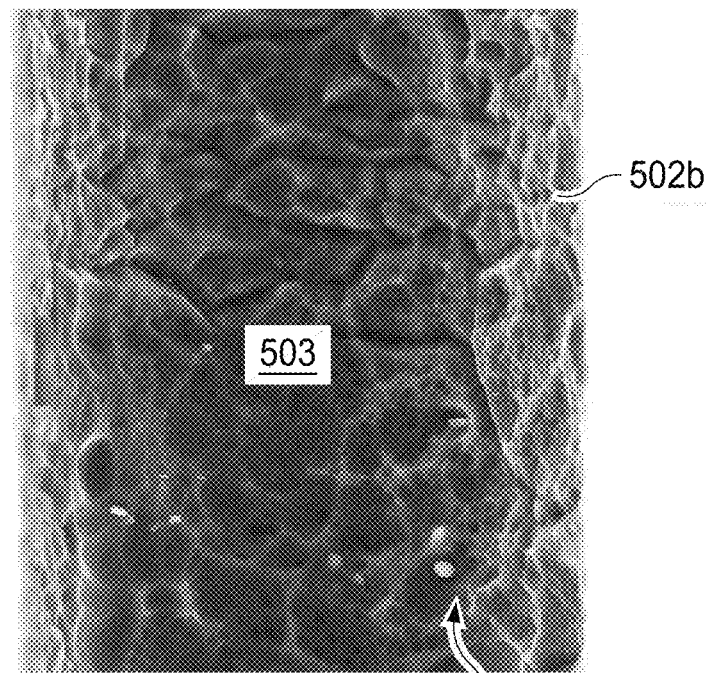
FIG. 21 a close up view of an EMD corner notch after chemical modification, according to one example embodiment.
Figure 25A:
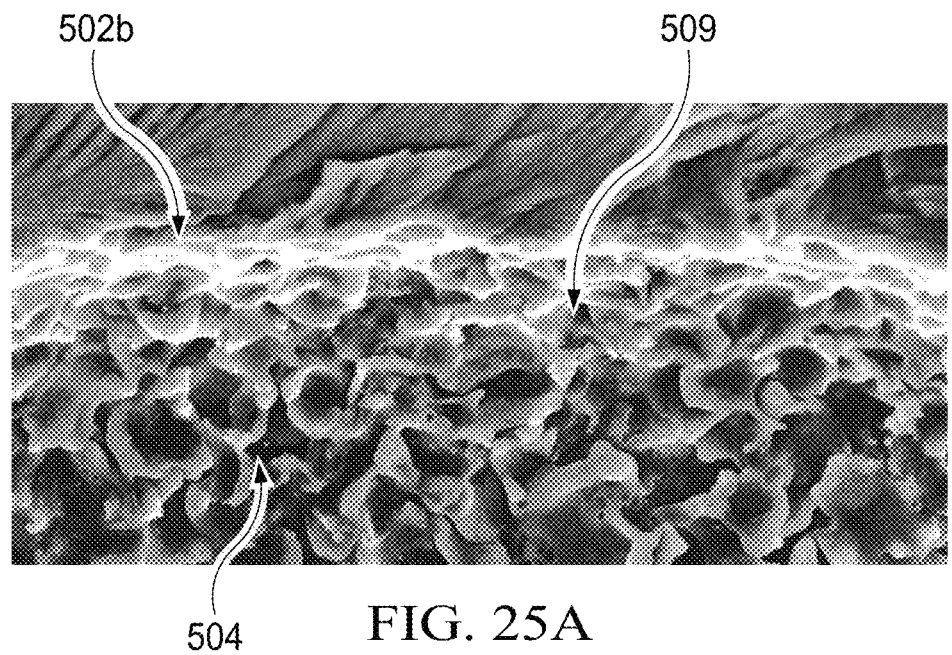
FIG. 25A is a close up view of an EMD corner notch before etching.
Figure 25B:
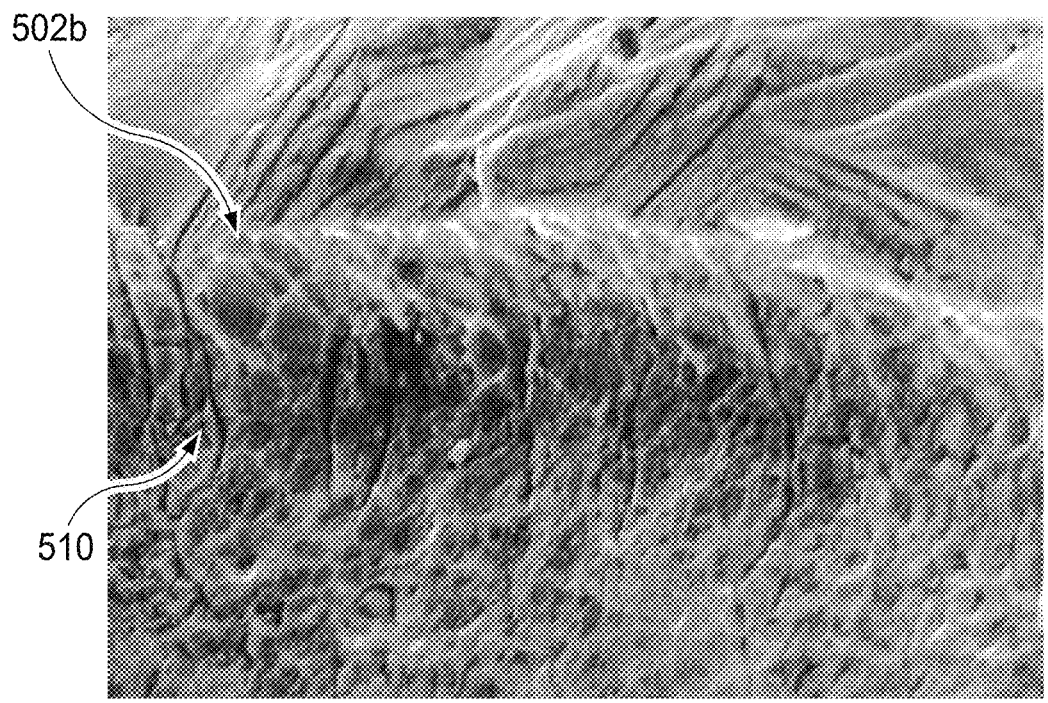
FIG. 25B is a close up view of the corner notch in FIG. 25A after etching, according to one example embodiment.

Referring to FIGS. 19-22 and 25A-25B, a portion of notch 503 is metallurgically depicted. A post-notching selective surface treatment method can be desirable to modify the EDM corner notch of the specimen 501 for flaw simulation. One purpose of the treatment method is to remove at least a portion of the re-melt material layer 504 from a surface of the notch 503. In an exemplary embodiment, the notch treatment method includes removing at least a portion of the re-melt layer 504 from the root 502b of the notch 503. In other embodiments, the notch treatment method includes removing at least a portion of the re-melt layer 504 from the lateral sides 502a of the notch 503. Another important purpose of the treatment method is to chemically attack and weaken the grain boundaries 512 on the etched surface 510 of notch 503 to make the evaluation more conservative. FIG. 19 shows an example of a corner notch 503 produced with an EMD process. FIG. 20 is a close-up view of the root 502b of the notch 503 with a re-melt layer 504 before a treatment method. FIG. 21 is a close-up view of root 502b of the notch 503 after a treatment method showing an etched surface 510 in the root 502b of the notch 503. FIGS. 25A-25B is another close-up view of root 502b of the notch 503 before and after a treatment method. FIG. 25A shows an un-etched notch surface 509 including a re-melt layer 504 on the root 502b; FIG. 25B shows an etched surface 510 on the root 502b. A comparison between FIGS. 20, 25A and FIGS. 21, 25B, respectively, reveals that the re-melt material layer 504 has been removed (e.g., disintegrated) from the etched surface 510 on notch 503 after a notch treatment method 551. This results in a desired notch severity (worst notch) for the test. The notch 503 with the etched surface 510 in the root 502b can be representative of the worst-case defects (e.g., the most unfavorable manufacturing flaws and operational defects) of the same size. For example, the notch 503 with the etched surface 510 can be representative of other types of defects of the same size such as, but not limited to, a dent, a scratch, a ding, corrosion, an inclusion, a surface flaw, a corner flaw, an inner flaw, a corrosion pit, a burr, a shot-peened overlap, a void, a pore, a fold, nonhomogeneity, and a forging parting plane.

Figure 26A:
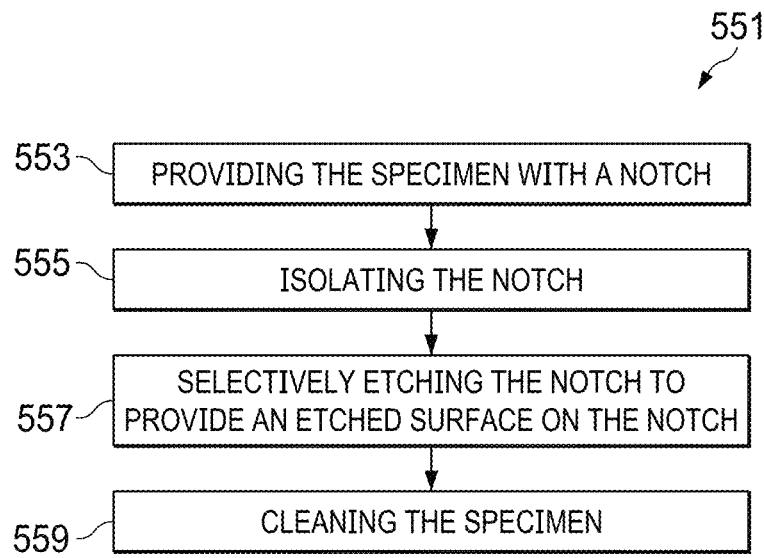
FIG. 26A is a schematic view of a treatment method for a notch on a specimen, according to one example embodiment.

Referring now to FIG. 26A, an exemplary embodiment of a notch treatment method 551 for flaw simulation is schematically illustrated. Method 551 can include a step 553 of providing the specimen with a notch 503, the notch 503 having a re-melt material layer 504 in a root of the notch; a step 555 of isolating the notch 503; a step 557 of selectively etching the notch 503 with an etching solution to provide an etched surface 510 at the root 502b of the notch 503; and a step 559 of cleaning the specimen. Each of these steps are described in further detail herein.

Method 551 includes the step 553 of providing the specimen with the notch 503, the notch having a re-melt material layer 504. Method 551 can be utilized for a specimen comprised of an applicable metal such as, but not limited to, aluminum, titanium, magnesium, steel, or an alloy therefor. Step 553 can include generating a notch 503 using EDM. In an illustrative embodiment, the notch 503 created by EDM can cause a re-melt material layer 504 comprised of the specimen alloy mixed with tungsten (e.g., from the tungsten wire used by the EDM) in the notch 503. The re-melt material layer 504 can be approximately 0.0001 inches thick and tends to be brittle in nature and differs in crystalline structure from the material to be tested. The brittle nature of the re-melt material layer 504 causes the root 502b of the notch 503 to be susceptible to premature cracking from test loading, to change the cracking mode, and to modify the desired testing outcome (e.g., the testing results may be inaccurate, too conservative, non-conservative, or variable).

Method 551 includes the step 555 of isolating the notch 503. In an embodiment, the step 555 can include cleaning of the specimen 501 to remove any unwanted debris and/or oils; for example, but not limitation, the specimen 501 can be submersed in liquid acetone for ultrasonic cleaning and acetate tape can be applied to the notch 503 to remove debris therein.

Figure 27:
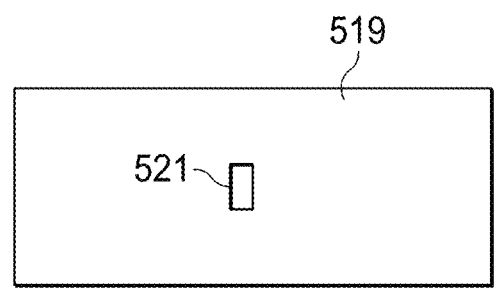
FIG. 27 is a top view of isolation layer with a slot, according to one example embodiment.
Figure 28:
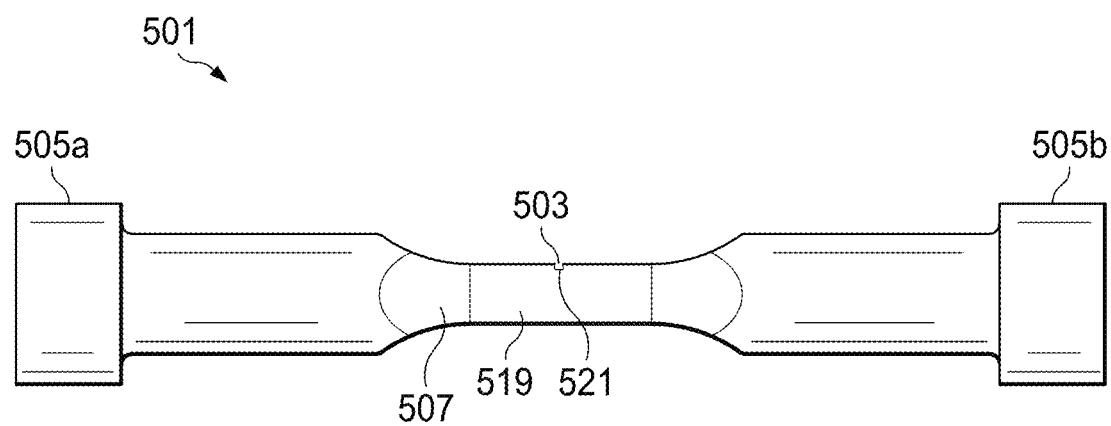
FIG. 28 is a side view of an isolation layer with a slot placed on a specimen with a notch such that slot exposes the notch, according to an exemplary embodiment.

The step 555 of isolating the notch 503 can include placing an isolation layer 519 with a slot 521 on to the specimen 501 such that the slot 521 exposes the notch 503 as shown in FIGS. 27 and 28. The isolation layer 519 can be an opaque polytetrafluoroethylene (PTFE) adhesive tape commercially available from 3M Company. Step 555 can include cutting a slot 521 in the isolation layer 519 having the dimensions of the notch 503. The isolation layer 519 with the slot 521 is then placed on the specimen 501 such that the slot 521 aligns with and exposes the notch 503. Any air bubbles between the isolation layer 519 and the specimen 501 are removed by pressing down on the isolation layer 519. In an illustrative embodiment shown in FIG. 28, the isolation layer 519 with the slot 521 is disposed in the gauge section 507 of the specimen 501.

Figure 29:
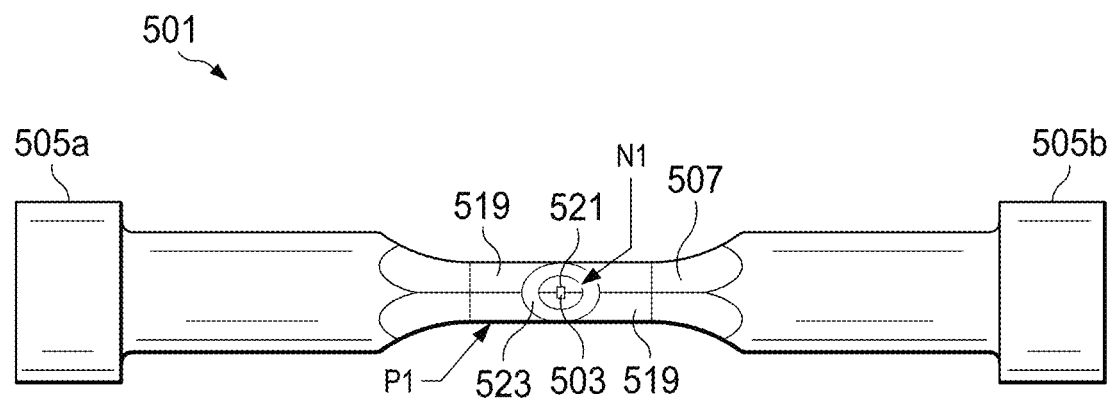
FIG. 29 is a top view of a dam disposed on the isolation layer on the specimen, according to an exemplary embodiment.
Figure 30:
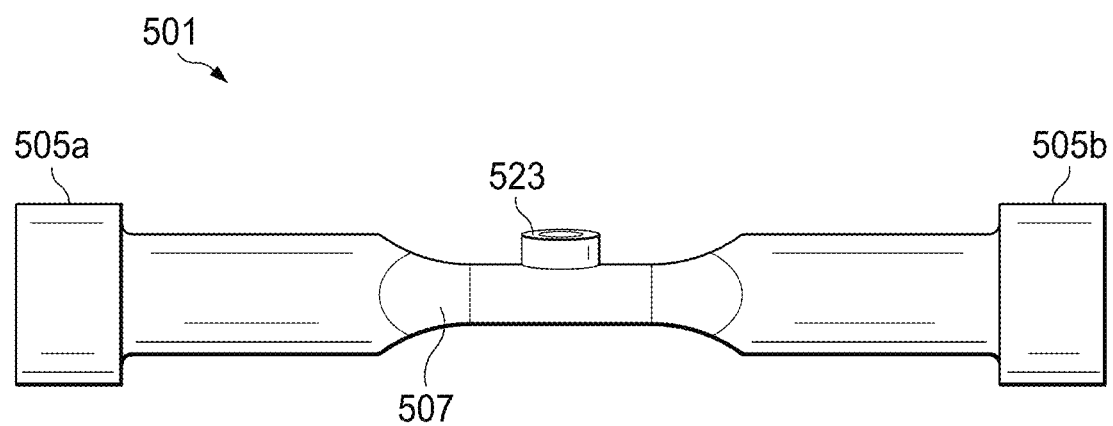
FIG. 30 is a side view of the dam on the specimen in FIG. 29.

The step 555 of isolating the notch 503 can include placing a dam 523 on the isolation layer 519 to form a notch area N1 and a peripheral area P1 on the specimen 201 as shown in FIGS. 29 and 30. The notch area N1 is on the inside of the dam 523 and the peripheral area P1 is on the outside of the dam 523. The notch area N1 is disposed at least partially around the notch. In some preferred embodiments, the notch 503 is substantially in the center of the notch area N1.

In an illustrative embodiment, the step of placing a dam 523 on the isolation layer 519 can include forming a moldable cylinder. The dam 523 can be formed from a moldable material such as a sealant tape commercially available as Tacky Tape commercially available from Illinois Tool Works Inc. The moldable material can be formed by curling or molding to form a complete cylinder, as shown in FIGS. 29 and 30. The dam 523 is then placed on the isolation layer 519 on the specimen 501 such that all bottom edges are touching the isolation layer 519. The specimen 501 with the isolation layer 519 and the dam 523 is placed in a rotatable vise and positioned so the dam 523 is oriented vertically and open at the top, as shown in FIG. 30.

Method 551 includes the step 557 of selectively etching the notch 503 to provide an etched surface 510 of the notch 503. The step 557 can include applying an etching solution to the notch area N1 to form the etched surface 510 of the notch 503. The etching solution can include at least one of the following: a sodium hydroxide solution, a Kroll's etchant solution, an acetic acid solution, an aqua regia solution, a Fry's reagent solution, and a nital solution. Each of these etching solutions are described in further detail herein. It should be noted that the step 557 of selectively etching is described using chemical etching/modification. In some embodiments, the step 557 of selectively etching can include electro-etching, blast erosion, or other etching procedures separate from or along with chemical etching/modification.

Method 551 includes the step 559 of cleaning the specimen 501. The step 559 of cleaning the specimen can include the steps of removing the isolation layer 519 and the dam 523 from the specimen 501 and cleaning the specimen to remove the etching solution and any debris or other contaminates. The step 559 of cleaning the specimen 501 is described in further detail herein.

In a particular embodiment, the specimen 501 comprises aluminum or an alloy thereof and the etching solution is a sodium hydroxide solution. In an exemplary embodiment, the sodium hydroxide solution is 10 g of NaOH mixed in 90 ml of de-ionized water. To etch the notch 503, the dam 523 is filled with the sodium hydroxide solution from about 6 minutes to about 15 minutes as required for the size and depth of the notch 503, with occasional agitation. After selectively etching the notch 503 to form an etched surface thereon, the aluminum specimen is then cleaned by removing the sodium hydroxide solution, dam 523, and isolation layer 519. The aluminum specimen 501 can then be flushed with isopropyl alcohol and hot air dried. The notch 503 can undergo further cleaning by wiping a nitric acid solution (50% in water) with a cotton swab thereon and then flushed with water and then isopropyl alcohol and dried.

In a particular embodiment, the specimen 501 comprises titanium or an alloy thereof and the etching solution is a Kroll's etchant solution. In an exemplary embodiment, the Kroll's etchant solution is 8 ml of HF, 30 ml of $HNO_3$ and 62 ml of $H_2O$. To etch the notch 503, the dam 523 is filled with the Kroll's etchant solution from about 4 minutes to about 12 minutes as required for the size and depth of the notch 503. After selectively etching the notch 503 to form an etched surface thereon, the titanium specimen is then cleaned by removing the Kroll's etchant solution, dam 523, and tape 519. The titanium specimen 501 can then be flushed with water and then with isopropyl alcohol and hot air dried.

In a particular embodiment, the specimen 501 comprises magnesium or an alloy thereof and the etching solution is an acetic acid solution. In an exemplary embodiment, the acetic acid solution is 1 ml of $HNO_3$, 25 ml of $H_2O$, 14 ml of acetic acid, and 60 ml of ethylene glycol or diethylene glycol. To etch the notch 503, the dam 523 is filled with the acetic acid solution from about 5 minutes to about 12 minutes as required for the size and depth of the notch 503. After selectively etching the notch 503 to form an etched surface thereon, the magnesium specimen is then cleaned by removing the acetic acid solution, dam 523, and tape 519. The magnesium specimen 501 can then be flushed with water and then with isopropyl alcohol and hot air dried.

The step 559 of cleaning the specimen 501 can include preserving the specimen 501 to prevent debris and corrosion of the specimen 501 and notch 503. The etched surface 510 of the notch 503 is viewed and documented by photomicrographs at the necessary magnification.

Figure 26B:
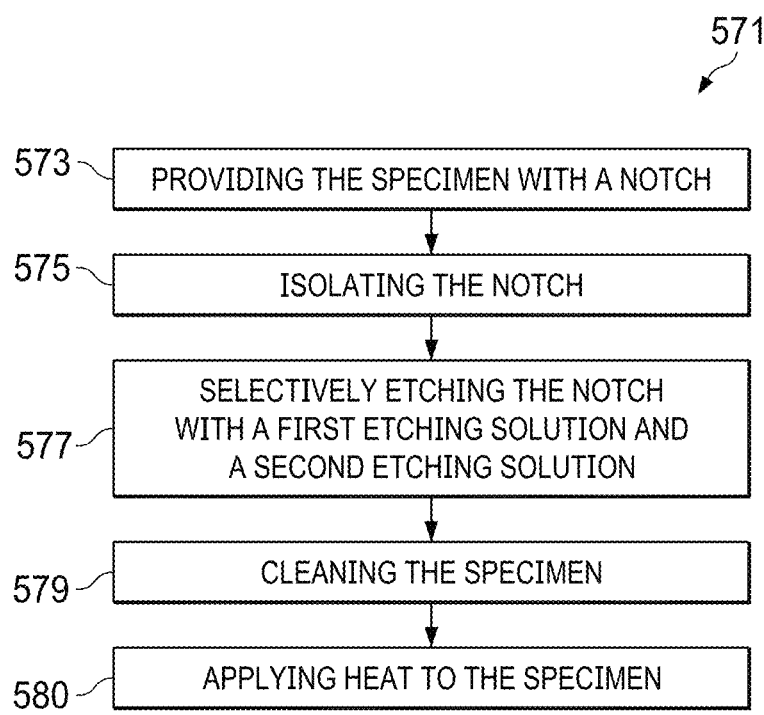
FIG. 26B is a schematic view of a treatment method for a notch on a specimen, according to an illustrative embodiment.

Referring now to FIG. 26B, another exemplary embodiment of a treatment method 571 for flaw simulation is schematically illustrated. Method 571 can include a step 573 of providing the specimen with a notch 503, the notch 503 having a re-melt material layer 504; a step 575 of isolating the notch 503; a step 577 of selectively etching the notch 503 with a first etching solution and a second etching solution to provide an etched surface 510 of the notch 503; a step 579 of cleaning the specimen; and a step 580 of applying a heat treatment to the specimen. The steps 573 and 575 in method 571 are substantially similar to the steps 553 and 555 in the method 551; therefore, for sake of efficiency only the steps 577, 579, and 580 will be described in further detail herein. However, one of ordinary skill in the art would fully appreciate an understanding of the steps 573 and 575 based upon the disclosure herein of the steps 553 and 555 in the method 551.

The step 577 can include applying a first etching solution and a second etching solution to the notch area N1 to form an etched surface 510 of the notch 503. In a particular embodiment, the specimen 501 comprises steel and the first etching solution is an aqua regia solution comprised of $HCl/HNO_3$ (3:1 ratio). In an exemplary embodiment of selectively etching the notch 503, the dam 523 is filled with the aqua regia solution from about 30 seconds to 4 minutes as required for the size and depth of the notch 503 and type of steel. The aqua regia solution is then discarded from the dam 523 and the second etching solution is filled in the dam 523.

In an embodiment, the specimen 501 is a stainless steel and the second etching solution is a Fry's reagent solution designated as ASTM standard E 407 formula number 79 "Fry's". The dam 523 is filled with the Fry's reagent solution from about 2 minutes to about 5 minutes as required for the size and depth of the notch 503. The step of 579 of cleaning the stainless steel specimen 501 can include discarding the Fry's reagent solution from the dam 523, removing the tape 519 and dam 523, flushing the specimen 501 with water and then isopropyl alcohol, and drying using hot air.

In an embodiment, the specimen 501 is a high strength steel and the second etching solution is a nital solution. In an embodiment, the high strength steel is a nickel-chromium-molybdenum alloy steel. The nital solution can comprise a 5% nitric acid (by volume) and alcohol (e.g., methanol, ethanol, or methylated spirits) solution. The dam 523 is filled with the nital solution from about 8 minutes to about 15 minutes as required for the size and depth of the notch 503. The step of 579 of cleaning the high strength steel specimen 501 can include discarding the nital solution from the dam 523, removing the tape 519 and dam 523, flushing the specimen 501 with water and isopropyl alcohol, and drying using hot air.

In an embodiment, the step 580 of applying a heat treatment to the specimen 501 occurs within 1 hour of step 579. The step 580 of applying heat is selectively adjusted for the type of steel and the required tensile strength for the aircraft component. In an exemplary embodiment, the heating temperature can be from about 250 degrees Fahrenheit to about 400 degrees Fahrenheit for about 3 hours to about 30 hours.

The step 579 of cleaning the specimen 501 can include preserving the specimen 501 to prevent debris and corrosion of the specimen 501 and notch 503. The etched surface 510 of the notch 503 is viewed and documented by photomicrographs at the necessary magnification.

Figure 31:
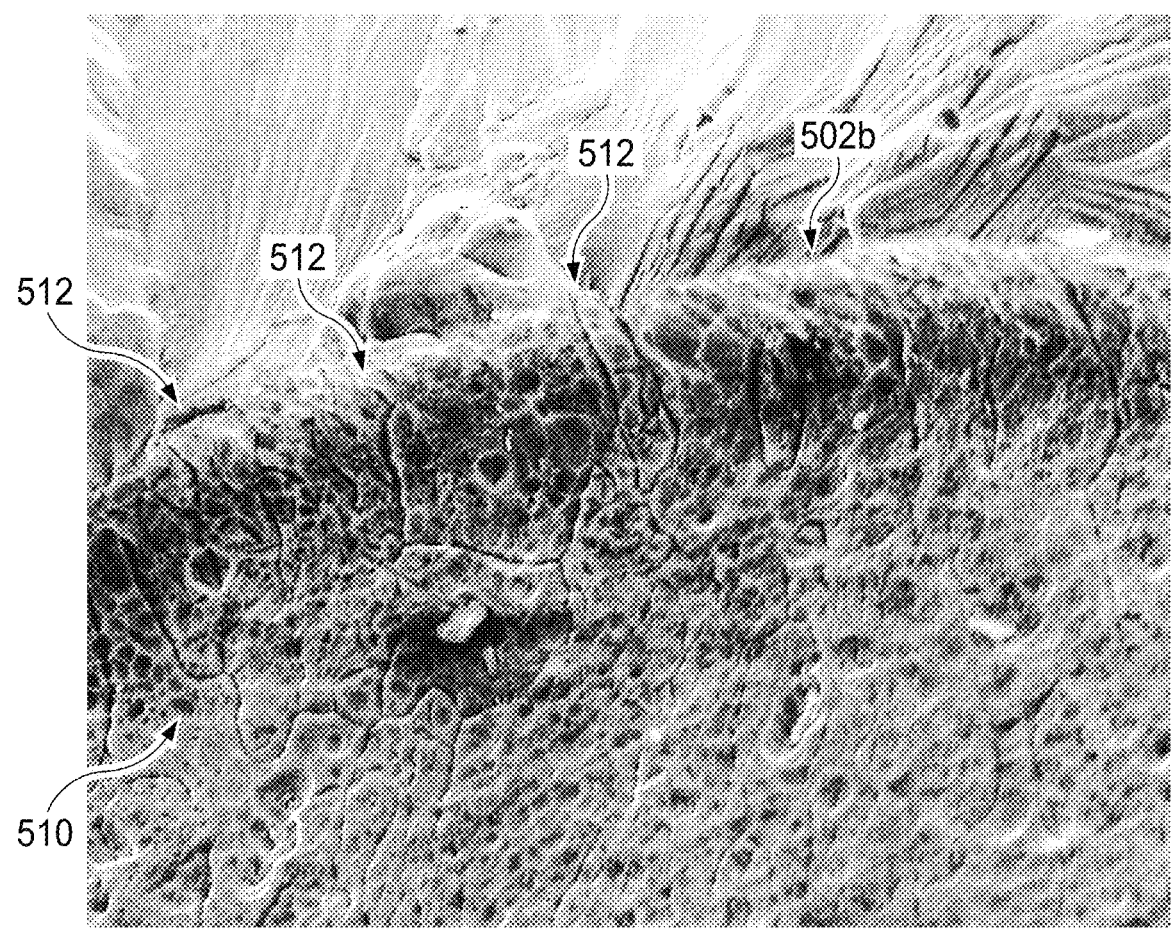
FIG. 31 is a close up view of microcracks in an etched surface of the notch root viewed from a cross-section of the center plane of the notch, according to one example embodiment.

In some embodiments, the notch treatment methods 551, 571 can penetrate, disintegrate, and dissolve at least a portion of the re-melt material layer from the notch 503. The treatment methods 551, 571 can advantageously remove at least a portion of the re-melt material layer from the notch 503. Moreover, the treatment methods 551, 571 can provide at least a portion of the etched surface 510 with microcracks extending from weakened grain boundaries 512, as shown in FIG. 31, which is a view of an etched surface 510 at a magnification of 300×. In some embodiments, the microcracks can include micro-pits in the etched surface 510, as shown in FIG. 25B. Microcracks form at the grain boundaries 512 of the etched surface 510 as a result of the treatment methods 551, 571. The treatment methods 551, 571 weaken the grain boundaries 512 on the etched surface 510 of the notch 503 (e.g., the notch surface after undergoing a treatment method 551, 571). The treatment methods 551, 571 advantageously provide an etched surface 510 on notch 503, which is representative of several worst-case defects of the same size. The treatment methods 551, 571 for flaw simulation can advantageously simplify the overall testing and analysis of specimens used to determine damage tolerance allowables for an aircraft structure.

Figure 22:
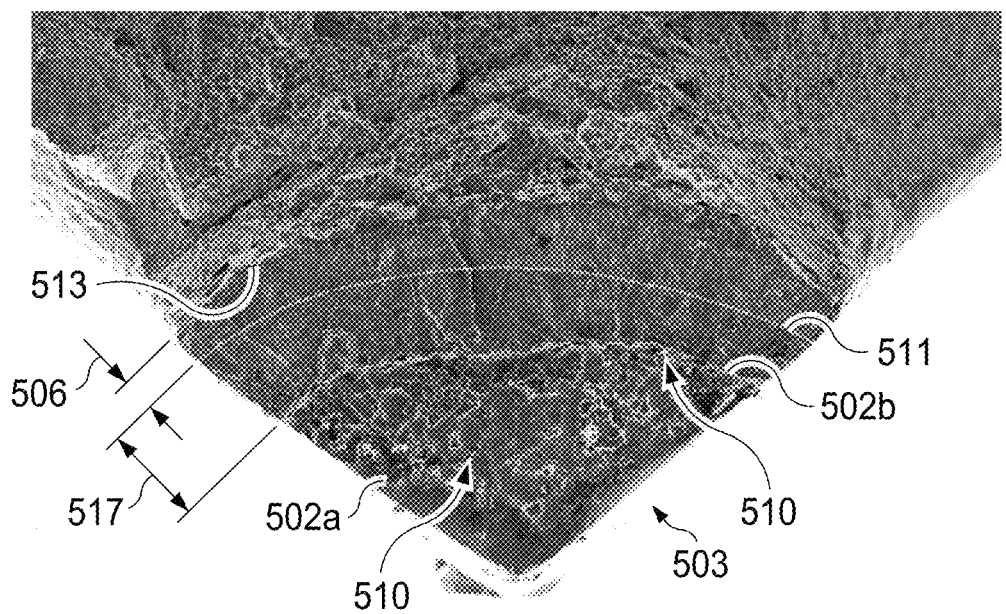
FIG. 22 a close up cross-sectional view of a notch front and crack front after chemical modification, according to one example embodiment.

FIG. 22 illustrates the notch 503 in a specimen 501 that has been sectioned at the crack plane after testing. Such a sectioning of specimens 501 can be performed to verify notch measurements and crack measurements using a scanning electron microscope (SEM) measurement, for example. Etching of the notch 503 results in an etched notch surface 510 on sides 502a and in the root 502b. During testing, a first stage crack growth 517 is created, which exists between notch root 502b and a first detected crack front 511. As discussed further herein, the test is temporarily halted upon detection of the first crack 511. The test can be resumed until a second stage crack growth 506 is created between first detected crack front 511 and a second detected crack front 513.

Figure 9:
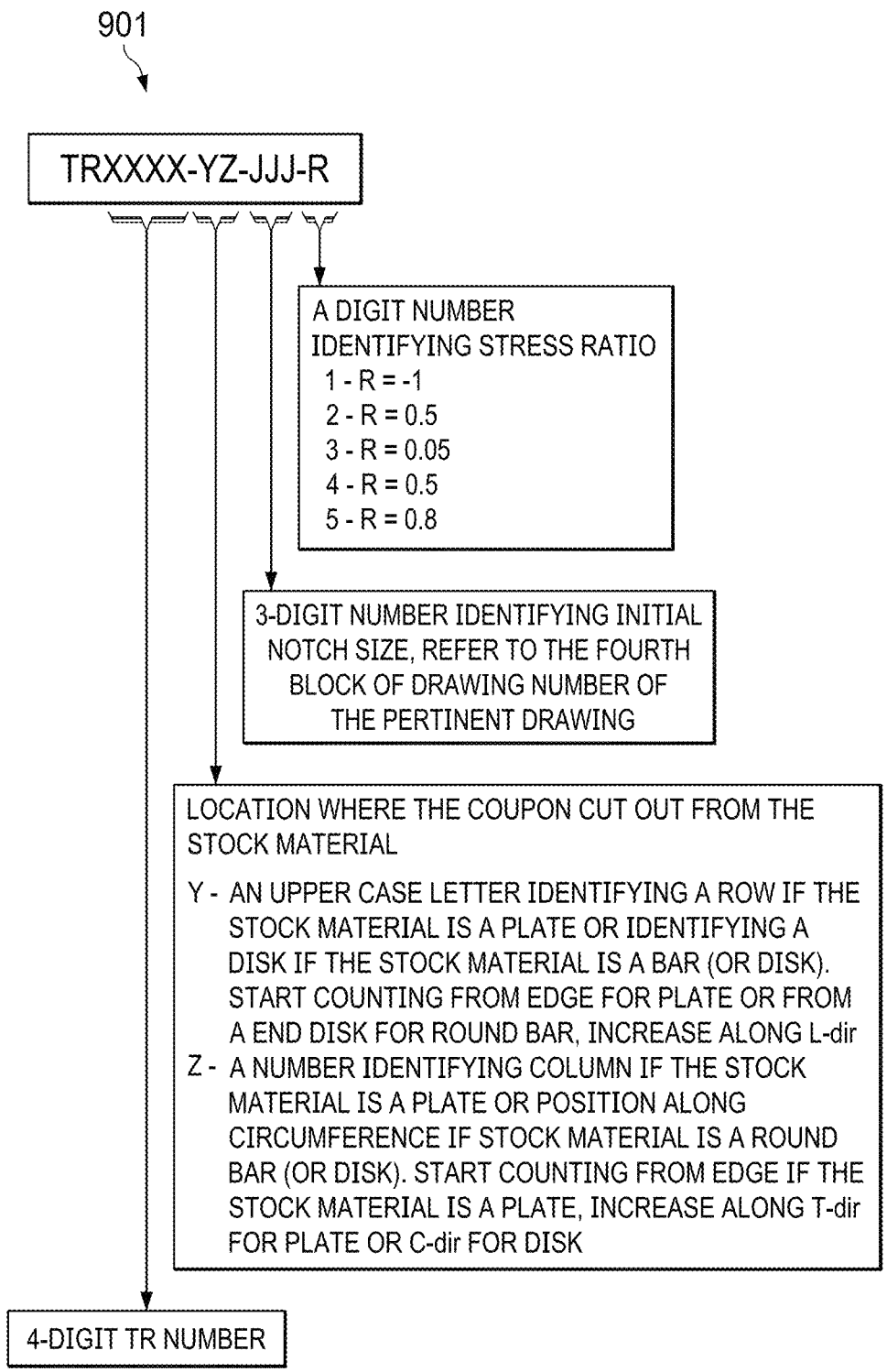
FIG. 9 is an illustrative specimen ID for a specimen, according to one example embodiment.

Now referring to FIG. 9, an exemplary specimen ID 901 can be utilized to mark each specimen 901 to keep track of critical information and insure accurate test data. The specimen ID 901 can include information such as: Test Request (TR) number, the location that specimen blank is cut out from the stock material, the notch size, and the stress ratio at which the coupon will be tested, as illustrated in FIG. 9.

Figure 10:
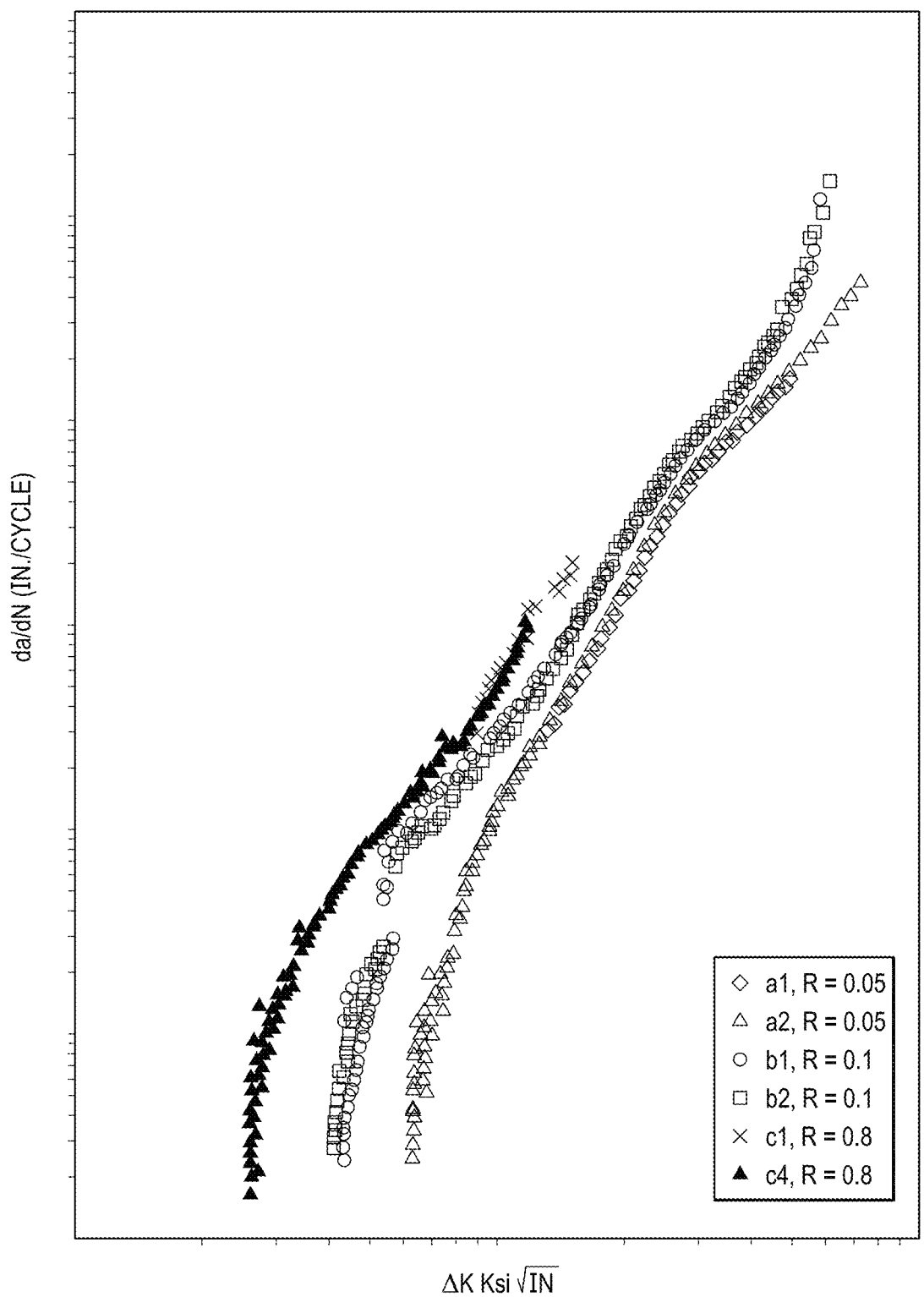
FIG. 10 is an illustrative da/dN vs. ΔK curve, according to one example embodiment.

Referring again to FIG. 2, method 201 further includes a step 205 of calculating an initial load. The step 207 of testing the specimen(s) 501 is an iterative process that starts with an initial load to converge the load to the point at which the flaw starts to grow. A reference da/dN vs. ΔK curve is preferred to narrow the range for the initial load determination. The reference information can be an existing $\Delta K_{TH}$ data or a plot of da/dN vs. ΔK curves referred for the material to be tested or for the materials that have characteristics similar to that to be tested. These characteristics include the chemical elements of the material, ultimate tensile strength (UTS), material form, and material treatments. FIG. 10 is an example of a da/dN vs. ΔK curve 1001 for Ti-6Al-4V.

Step 205 can further include using a stress intensity factor (SIF) to calculate the initial load. SIF equations for a corner notch (crack) of a square bar can be used in the initial load calculation. In one example embodiment, a correction factor can be used to account for geometrical effects on SIF. FIG. 8 depicts geometries and loading application for the test procedure. Table 2 lists the notations of FIG. 8 and the associated descriptions.

TABLE 2

Specimen Matrix

| Symbol | Description |
| --- | --- |
| $b_1$ | Width of the cross-section on the side of the gauge aligning with L-direction |
| $b_2$ | Width of the cross section on the side of the gauge align with T-direction |
| $S_0$ | Magnitude of uniform remote stress |
| $c_1$ | Crack length measured on the side aligning with L-direction of the gauge |
| $c_2$ | Crack length measured on the side aligning with T direction of the gauge |

Method 201 is an iterative process which can include an interval of cycles, such as 1,000,000 cycles for example, for each step of iteration until a flaw (or a crack) starts to grow. In order to determine the load at which a flaw starts to grow, the test starts with an initial load and iterates with the calculated load increments until the flaw grows. The initial load can be determined based on the reference threshold $\Delta K_{TH}$ for stress ratio $R_0=0$ and the traditional A=0.8 approximation for differentiated stress ratio $R_1$. Starting with the reference $\Delta K_{TH}$, Equations 1-8 are the basis to determine initial load from stress intensity factor (SIF) for a corner crack initiation test. By re-arranging Equation 1, with the support of Equations 2-8 and Table 3, the remote stress $S_0$ can be calculated. Multiplying $S_0$ by area of gauge cross-section, the initial load can be determined.

$$K = F_0 S_0 \sqrt{\pi c} \tag{1}$$

$$F_0 = f_x f_\phi f_a f_0 \tag{2}$$

$$f_x = \left[1 + 1.464\left(\frac{c1}{c2}\right)^{1.65}\right]^{-\frac{1}{2}}, \quad \text{for } \frac{c1}{c2} \le 1 \tag{3}$$

$$f_x = \left[1 + 1.464\left(\frac{c2}{c1}\right)^{1.65}\right]^{-\frac{1}{2}}, \quad \text{for } \frac{c1}{c} > 1 \tag{4}$$

$$f_\phi = \left[\left(\frac{c1}{c2}\cos\phi\right)^2 + \sin^2\phi\right]^{\frac{1}{4}}, \quad \text{for } \frac{c1}{c2} \le 1 \tag{5}$$

$$f_\phi = \left[\cos^2\phi + \left(\frac{c2}{c1}\sin\phi\right)^2\right]^{\frac{1}{4}}, \quad \text{for } \frac{c1}{c2} > 1 \tag{6}$$

$\phi = 0°$ at $c_2$-tip,
$\phi = 90°$ at $c_1$-tip $$f_a = 1, \quad \text{for } \frac{c1}{c2} \le 1 \tag{7}$$

$$f_a = \sqrt{\frac{c2}{c1}}, \quad \text{for } \frac{c1}{c2} > 1 \tag{8}$$

$f_0$ = Tabular data (Table 301 in FIG. 3)

Referring again to FIG. 2, method 201 further includes a step 207 of testing the specimen(s) 501. Step 207 includes iteratively loading a specimen 501 at stepped loads for an implementation specific number of cycles until a flaw (or a crack) starts to grow in corner notch 503. The test process in step 207 starts with an Initial Load ($P_0$) and ends at the Final Load ($P_C$) at which the flaw (or crack) starts to grow. Each test determines the Final Load, Mean Stress, and Oscillatory Stress for the given flaw size, stress ratio, and limited cycles.

Figure 11:
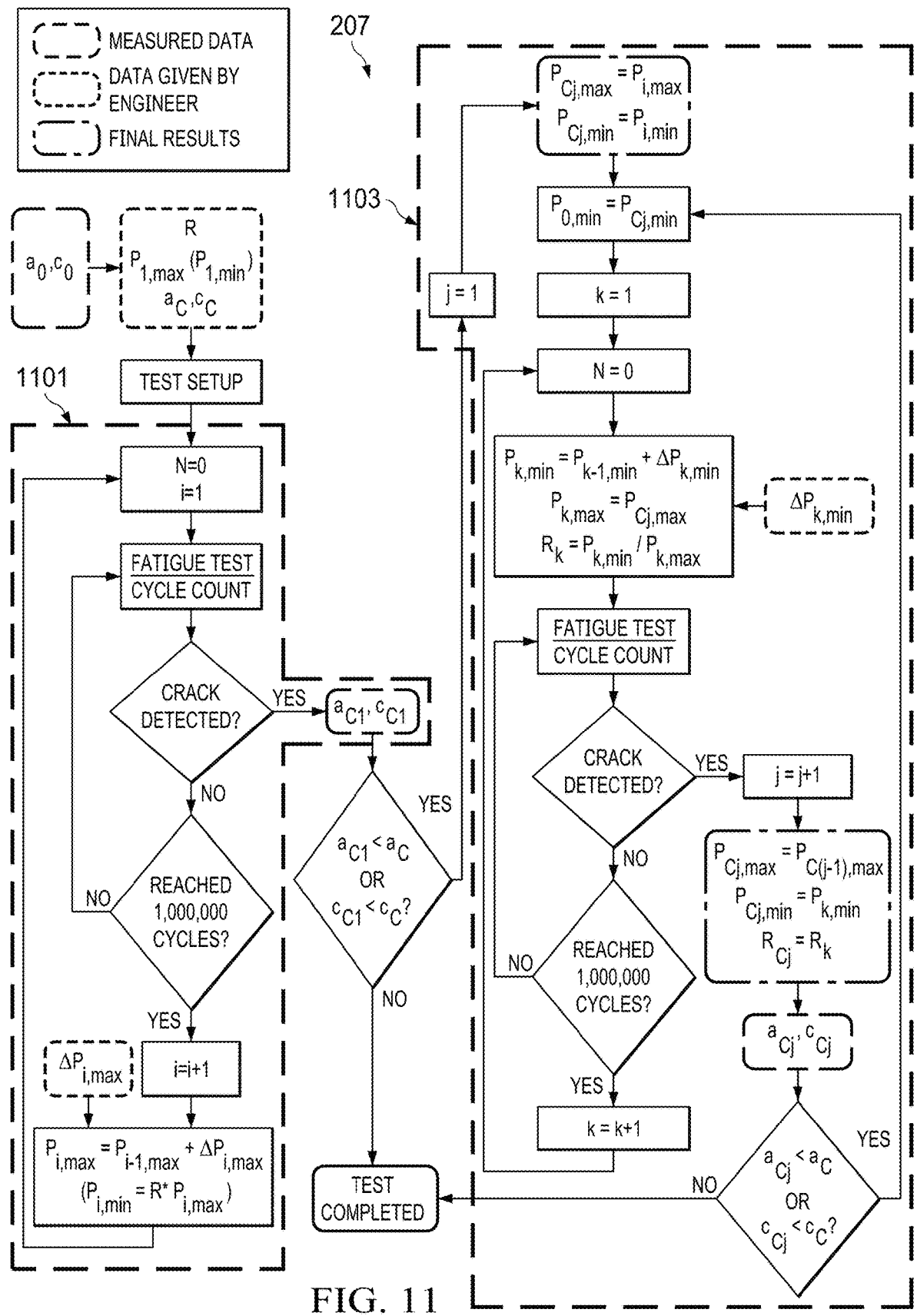
FIG. 11 is a schematic view of a process of testing a specimen, according to one example embodiment.

Referring also to FIG. 11, pretest data can include: 1) gauge section dimensions t and W (measurements), 2) notch dimensions $a_0$, $c_0$, and b, where b is the width of the notch (measurements), 3) stress ratio R, 4) Initial Load $P_1$, 5) final crack length $a_c$ and $c_c$, 6) testing frequency, and 7) lab temperature (recorded by the testing lab), and 8) lab humidity (recorded by the testing lab).

After entering any pretest data, the testing step 207 can further include: installing the specimen 501, tuning for alignment, calibrating the measurement and data acquisition system, setting $P_{max}$ and $P_{min}$ for cyclic load, setting potential drop (PD) using a needle-spring method.

Figure 12:
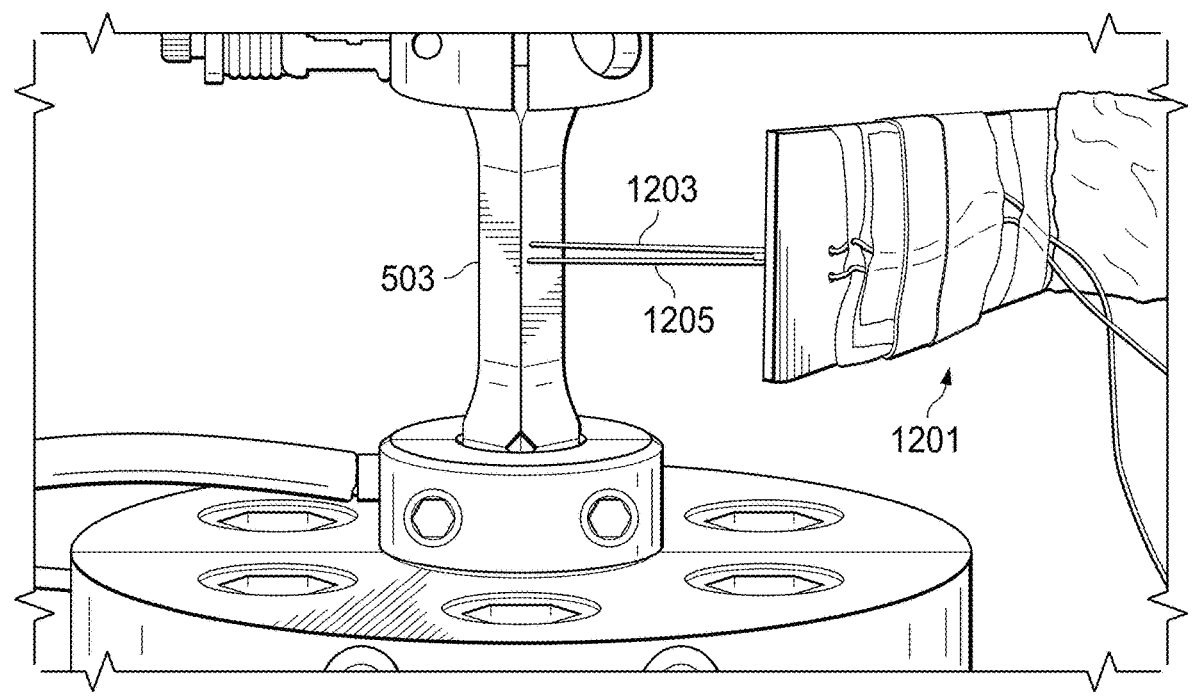
FIG. 12 is a perspective view of a test setup that uses a potential drop (PD) to determine an occurrence of crack growth, according to one example embodiment.

Referring also to FIG. 12, a specimen 501 is illustrated installed in a test setup. A first needle 1203 and a second needled 1205 are pressed against either side of the notch 503. During testing, a current is passed through the notch 503 between needles 1203 and 1205. The detection of crack growth is a result of a change in electrical resistance between needles 1203 and 1205. The utilization of needles 1203 and 1205 in a PD system 1201 prevents the need for welding or otherwise attaching sensors that could prove an undesired cracking or annealing of the specimen 501. In one example embodiment, the PD system 2101 is set such that the test stops when $\Delta a = (0.001 \sim 0.004)$ inch, for example. In one example embodiment, the cycle count (N) is set to zero prior to the start of a test block, and the maximum cycle number is set to 1,000,000 for a testing block such that the test stops at N=1,000,000 if no $\Delta a$ is detected.

Referring again to FIG. 11, step 207 of method 201 is illustrated in a block diagram format. Step 207 can be broken down between a constant R testing loop 1101 and a constant $P_{max}$ testing loop 1103. Each of the constant R testing loop 1101 and a constant $P_{max}$ testing loop 1103 are discussed further herein.

Figure 13:
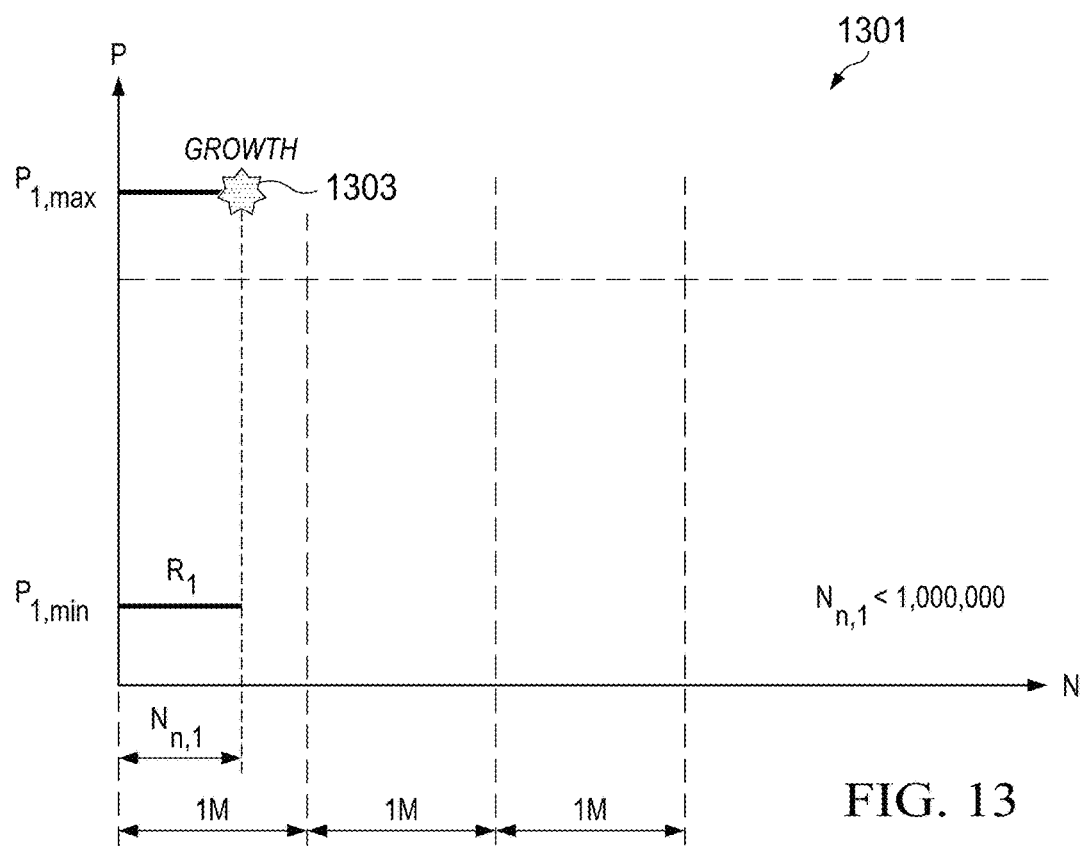
FIG. 13 is a graph, according to one example embodiment.
Figure 14:
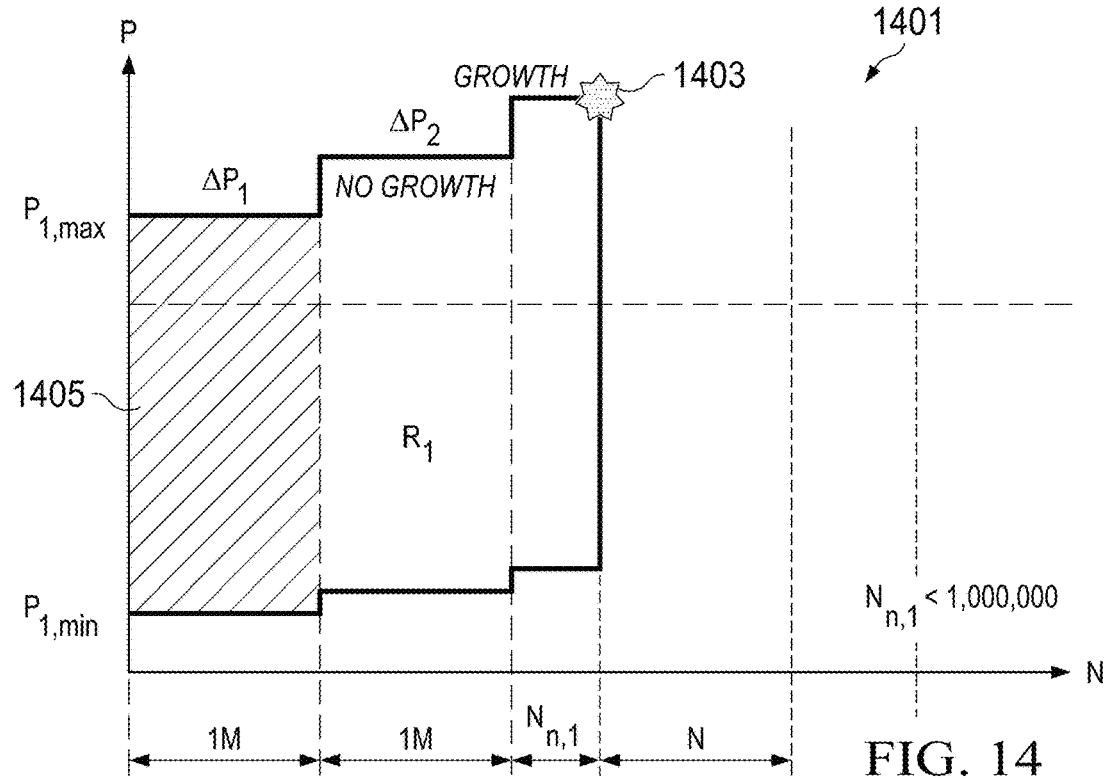
FIG. 14 is a graph, according to one example embodiment.

The constant R testing loop 1101 can include starting the test with the PD 1201 turned on and cycle count on. If a crack extension is detected via the PD 1201, the test is stopped, as shown in graph 1301 of FIG. 13. In the illustrated graph 1301, a crack extension is detected at occurrence 1303, which is as a point in time short of the first full 1,000,000 cycles. Next the crack dimensions are measured. In one example embodiment, the dimensions of the crack, such as first crack 517, can be measured by an optical microscope on the sides of specimen 501 while the specimen is still attached to the test setup. If crack dimensions exceed the given final crack length $a_c$ and $c_c$, the test is completed and the results are reported. If crack dimensions do not reach $a_c$ and $c_c$, then the test proceeds to the next step. If a crack extension is not detected, the test continues until 1,000,000 cycles are reached and a testing block is considered completed. An example completed testing block that did not experience crack extension is illustrated as testing block 1405 as shown by graph 1401 in FIG. 14. The next step-load is prepared, the cycle count is reset to zero, and the test restarted. The steps are repeated until a crack extension is detected or until "stop-test", whichever comes first, then the constant R testing loop 1101 (FIG. 11) is exited. In the illustrated graph 1401, a crack extension is detected at occurrence 1403, which is as a point in time after two full 1,000,000 cycles, but short completion of the third stepped 1,000,000 cycle testing block.

Figure 15:
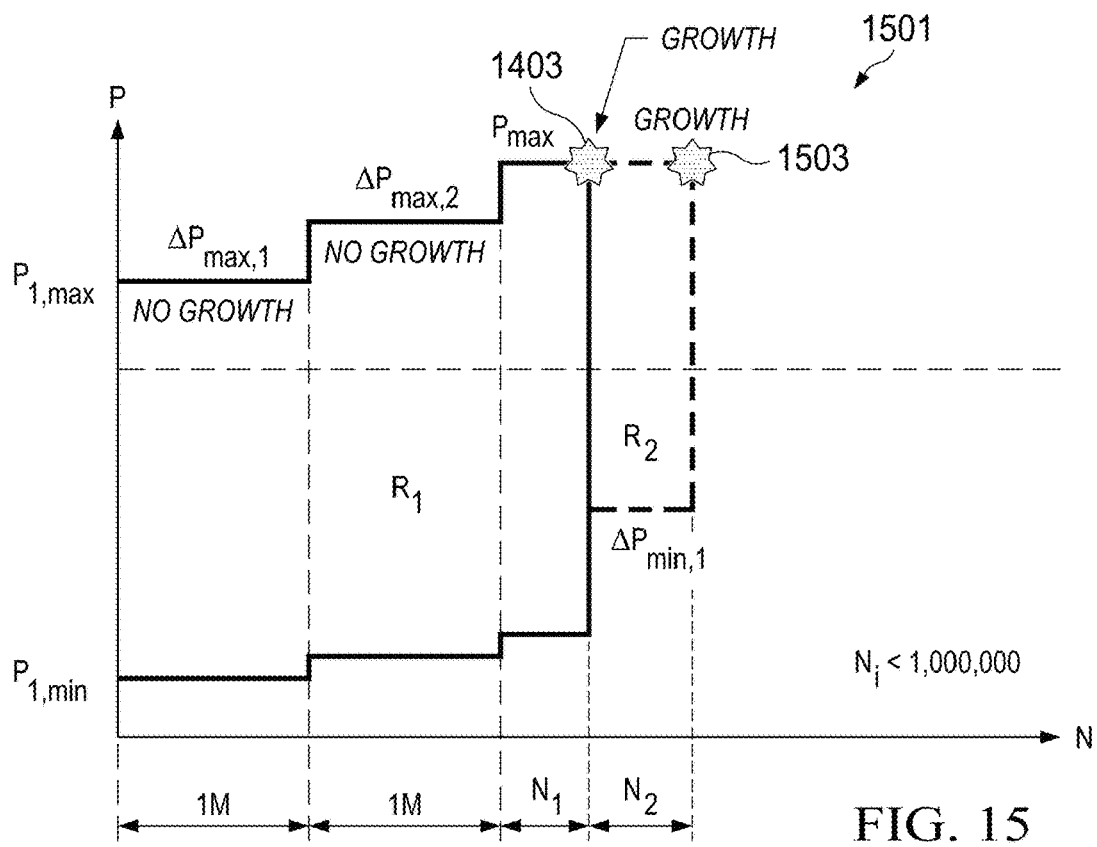
FIG. 15 is a graph, according to one example embodiment.
Figure 16:
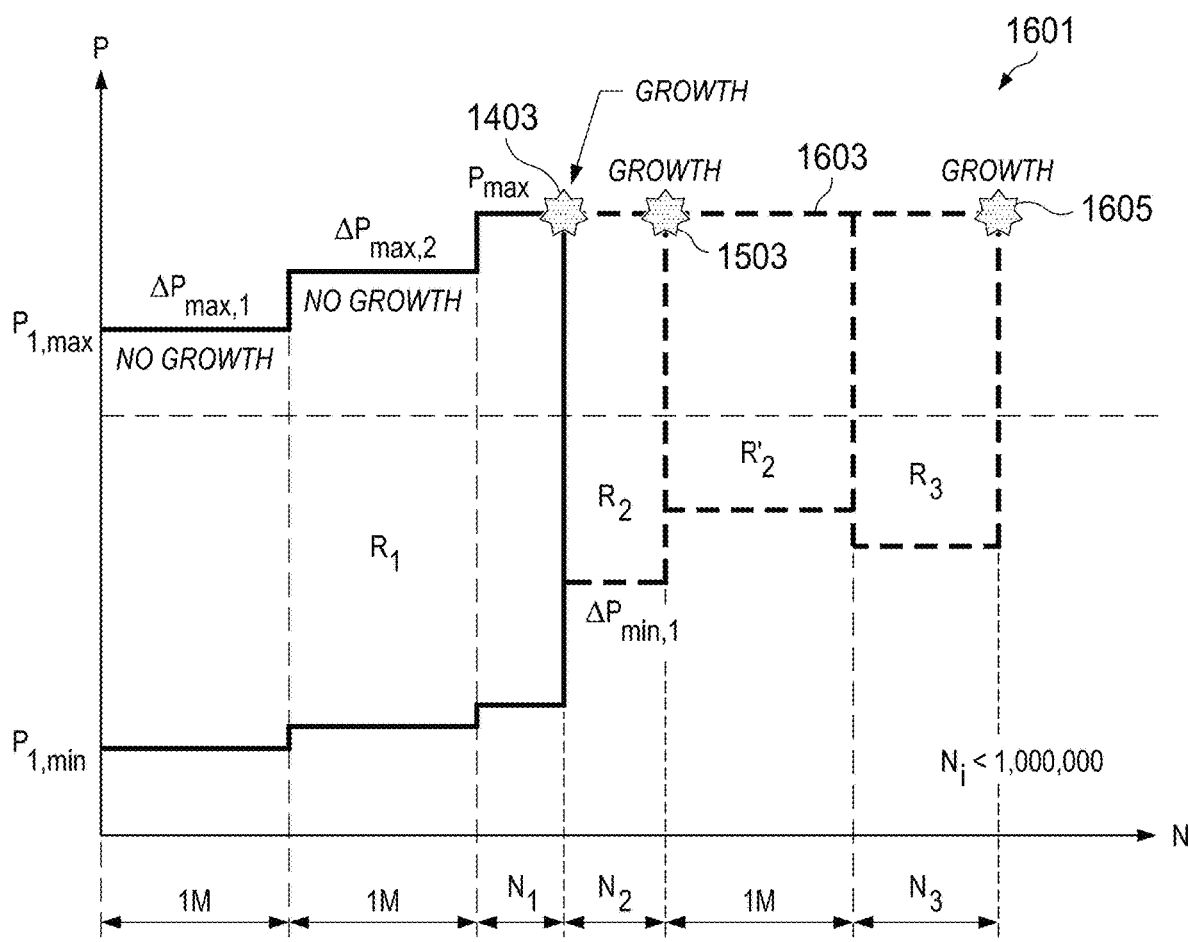
FIG. 16 is a graph, according to one example embodiment.

The constant $P_{max}$ testing loop 1103 with stepped $P_{min}$, constant $P_{max}$, and varying R can include resetting cycle count to zero and resetting loads with an increased $P_{min}$ while keeping the $P_{max}$ the same as that at the constant R loop 1101. Next the test is resumed with cycle count and PD 1201 turned on. If a crack extension is detected at an occurrence 1503 via PD, the test is stopped, as shown in graph 1501 of FIG. 15. Next the extended crack dimension is measured. If the crack dimension exceeds the given final crack length $a_c$ and $c_c$, the test is completed. If the crack dimensions do not reach $a_c$ and $c_c$, then the test continues to the next step. If a crack extension is not detected by PD 1201, the test continues until 1,000,000 cycles are reached at occurrence 1603 and a testing block is considered completed, as shown in graph 1601 of FIG. 16. The results are reported and the process proceeds with the next step-load and instructions. The steps are repeated until a crack extension is detected at an occurrence 1605 or until "stop-test", whichever comes first, then the constant $P_{max}$ testing loop 1103 (FIG. 11) is exited.

Method 201 can also include a step 209 of processing the data from the test. Step 209 is intended to extract the specimen and testing information for each test and determine the validity of the testing result data. Valid data for a threshold testing program can be defined as the data at the crack initiation (or extension) $\Delta a/\Delta N \leq 4 \times 10^{-9}$ in/cycle. If this criterion is met at the crack initiation, the load is valid as a threshold for no-growth. If the threshold criterion is not met at the crack initiation, the previous run-out load can be used instead.

The immediate test data are the no-growth threshold fatigue loads, i.e. maximum load $P_{max}$ and minimum load $P_{min}$, from which fatigue mean and oscillatory load $P_{mean}$ and $P_{osc}$ can be converted:

$$P_{mean} = (P_{max} + P_{min})/2 \quad \text{(Eq. 1)}$$

$$P_{osc} = (P_{max} - P_{min})/2 \quad \text{(Eq. 2)}$$

The no-growth threshold stresses can be calculated as loads divided by notch plane area A:

$$S_{mean} = P_{mean}/A \quad \text{(Eq. 3)}$$

$$S_{osc} = P_{osc}/A \quad \text{(Eq. 4)}$$

Data can be organized in categories of flaw and crack. Under each category, data can be grouped by nominal notch dimensions. In cases where the actual notch/crack length is not the same as nominal length, an adjustment can be made based on geometrical parameter β of Linear Elastic Fracture Mechanics (LEFM):

$$S_{nominal} = S_{actual}(\beta_{actual}/\beta_{nominal})\sqrt{(a_{0,actual}/a_{0,nominal})} \quad \text{(Eq. 5)}$$

For example, in a group of $a_0$=0.010-in, the actual notch dimensions can be measured as 0.012, 0.009, 0.010, 0.012, 0.010, 0.008, 0.011, etc. The LEFM adjustment can be made to collapse the non 0.010-in data onto 0.010-in equivalent. Similarly, the data can be adjusted if the crack lengths that are measured during testing are different from the actual crack lengths determined in a post-test measurement.

Table 3 shows an example of organized geometrical and testing results data of a material for a nominal $a_0$=0.010-in group. Based on this data table, the threshold loads are determined and the threshold stresses are calculated accordingly.

TABLE 3

Example Data Table of Organized Geometrical and Test Results Data

| Notch Length | Specimen# | 0' - Notch | | 1 - Crack | | b1 | b2 | R | N |
|---|---|---|---|---|---|---|---|---|---|
| | | $c_{1,0}$ | $c_{2,0}$ | $c_{1,c}$ | $C_{2,c}$ | | | | |
| 0.010 | TR4473-B1-103-1 | 0.0115 | 0.0105 | 0.0160 | 0.0150 | 0.2593 | 0.2607 | −1 | 643,483 |
| | TR4473-B2-103-1 | 0.0100 | 0.0098 | 0.0110 | 0.0110 | 0.2597 | 0.2592 | −1 | 33,370 |
| | TR4473-B5-103-3 | 0.0118 | 0.0107 | 0.0210 | 0.0150 | 0.2600 | 0.2600 | 0.05 | 59,278 |
| | TR4473-B6-103-3 | 0.0092 | 0.0110 | 0.0130 | 0.0130 | 0.2597 | 0.2606 | 0.05 | 182,745 |
| | TR4473-B8-103-3 | 0.0127 | 0.0106 | 0.0127 | 0.0106 | 0.2594 | 0.2603 | 0.05 | 1,000,000 |
| | TR4473-B9-103-4 | 0.0098 | 0.0093 | 0.0098 | 0.0093 | 0.2603 | 0.2604 | 0.50 | 1,000,000 |
| | TR4473-B11-103-5 | 0.0093 | 0.0106 | 0.0093 | 0.0106 | 0.2606 | 0.2606 | 0.74 | 1,000,000 |
| | TR4473-B11-103-6 | 0.0093 | 0.0106 | 0.0093 | 0.0106 | 0.2606 | 0.2606 | 0.80 | 1,000,000 |

| Notch Length | Specimen# | $P_{max}$ (at break) | $P_{max}$ (previous) | Runout at last run? | $c_1/c_2$ | ΔC, min | ΔC, max |
|---|---|---|---|---|---|---|---|
| 0.010 | TR4473-B1-103-1 | 1,808 | 1,469 | no | 1.095 | 0.0045 | 0.005 |
| | TR4473-B2-103-1 | 1,900 | 1,543 | no | 1.020 | 0.001 | 0.001 |
| | TR4473-B5-103-3 | 3,087 | 2,487 | no | 1.103 | 0.004 | 0.009 |
| | TR4473-B6-103-3 | 3,205 | 2,787 | no | 0.836 | 0.002 | 0.004 |
| | TR4473-B8-103-3 | 2,752 | 2,061 | yes | 1.198 | 0.000 | 0.000 |
| | TR4473-B9-103-4 | 4,611 | 3,747 | yes | 1.054 | 0.000 | 0.000 |
| | TR4473-B11-103-5 | 6,621 | 0 | yes | 0.877 | 0.000 | 0.000 |
| | TR4473-B11-103-6 | 6,621 | 5,857 | yes | 0.877 | 0.000 | 0.000 |

Figure 17:
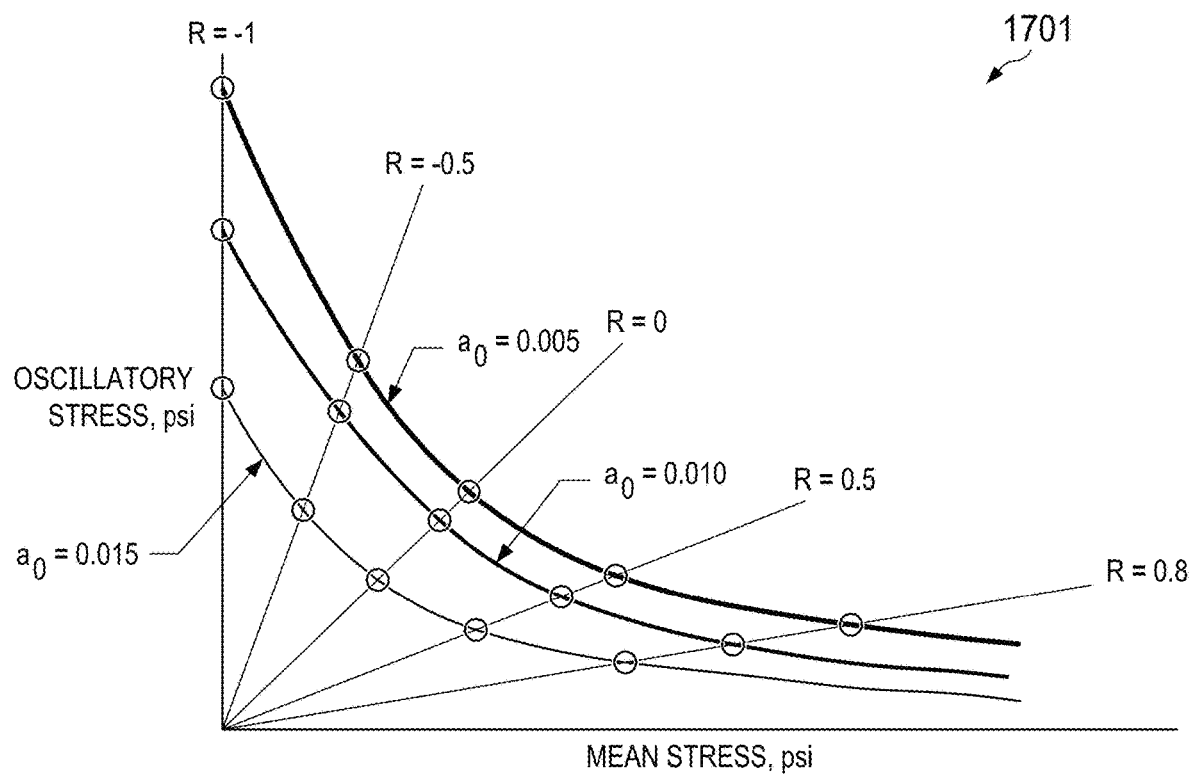
FIG. 17 is a graph, according to one example embodiment.

After data for all groups and categories are analyzed, they can be plotted in a graph 1701 as shown in FIG. 17 as threshold stresses for no-growing flaw and crack for the material. For each flaw/crack length, a curve fit is generated based on the lowest data points.

Referring now to FIG. 4, a method 401 of a designing and manufacturing a part or structure of an aircraft, such as rotorcraft 101, is schematically illustrated. An illustrative structure is bulkhead 113, shown in FIG. 1. A step 403 can include designing a structure with a computer aided design (CAD) tool which can include defining a preliminary geometry of the structure. Step 403 can include performing a stress analysis of the structure, this analysis can include analytically subjecting the structure to loads, calculating the stress, and evaluating the stress with regard to the damage tolerance allowables, the damage tolerance allowables being calculated using method 201 described herein. Step 403 can include iteratively changing the geometry of the part until a weight efficient configuration is reached. In one embodiment, the geometry of the structure is iteratively optimized so as to meet the stress allowables without having unnecessary weight. A step 405 can include manufacturing the structure to the geometry defined in step 403.

Figure 18:
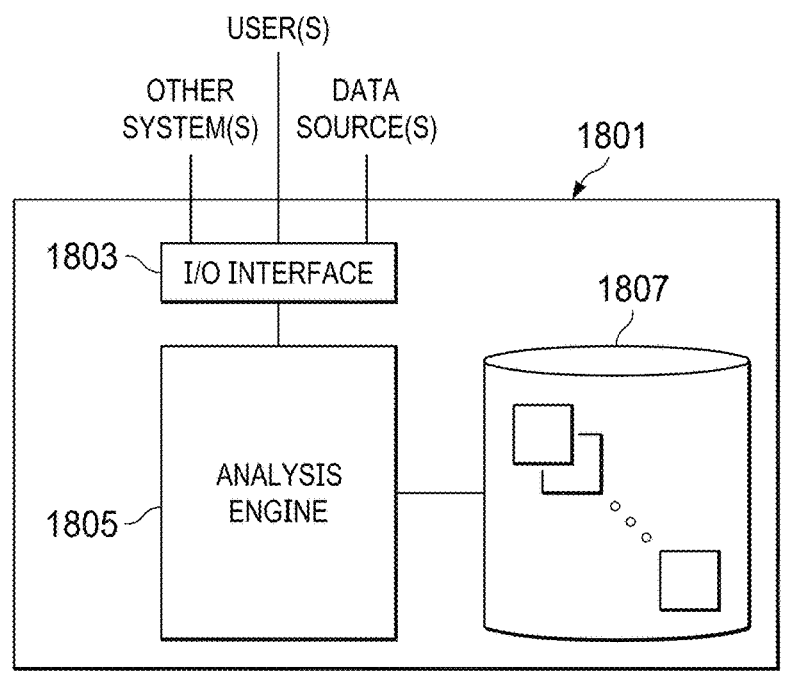
FIG. 18 is a schematic view of a computer system, according to one example embodiment.

Referring now also to FIG. 18, a computer system 1801 is schematically illustrated. Computer system 1801 can be configured for performing one or more functions with regard to the operation of system and method further disclosed herein. Further, any processing and analysis can be partly or fully performed by computer system 1801. Computer system 1801 can be partly or fully integrated with other aircraft computer systems.

The system 1801 can include an input/output (I/O) interface 1803, an analysis engine 1805, and a database 1807. Alternative embodiments can combine or distribute the input/output (I/O) interface 1803, analysis engine 1805, and database 1807, as desired. Embodiments of the system 1801 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 1803 can provide a communication link between external users, systems, and data sources and components of the system 1801. The I/O interface 1803 can be configured for allowing one or more users to input information to the system 1801 via any known input device. Examples can include a keyboard, mouse, touch screen, and/or any other desired input device. The I/O interface 1803 can be configured for allowing one or more users to receive information output from the system 1801 via any known output device. Examples can include a display monitor, a printer, cockpit display, and/or any other desired output device. The I/O interface 1803 can be configured for allowing other systems to communicate with the system 1801. For example, the I/O interface 1803 can allow one or more remote computer(s) to access information, input information, and/or remotely instruct the system 1801 to perform one or more of the tasks described herein. The I/O interface 1803 can be configured for allowing communication with one or more remote data sources. For example, the I/O interface 1803 can allow one or more remote data source(s) to access information, input information, and/or remotely instruct the system 1801 to perform one or more of the tasks described herein.

The database 1807 provides persistent data storage for system 1801. While the term "database" is primarily used, a memory or other suitable data storage arrangement may provide the functionality of the database 1807. In alternative embodiments, the database 1807 can be integral to or separate from the system 1801 and can operate on one or more computers. The database 1807 preferably provides non-volatile data storage for any information suitable to support the operation of the system and method disclosed herein, including various types of data discussed further herein. The analysis engine 1805 can include various combinations of one or more processors, memories, and software components.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A notch treatment method for flaw simulation, comprising:
    providing a specimen with a notch, the notch having a re-melt material layer, the specimen comprises aluminum or an alloy thereof;
    isolating the notch, the step of isolating the notch comprises placing an isolation layer with a slot onto the specimen such that the slot exposes the notch and placing a dam on the isolation layer to form a notch area and a peripheral area on the specimen, wherein the notch area is disposed at least partially around the notch; and
    selectively etching the notch using an etching solution comprising a sodium hydroxide solution to provide an etched surface of the notch;
    wherein at least a portion of the re-melt material layer has been removed from the notch.

2. The treatment method according to claim 1, wherein the step of providing the specimen with the notch comprises:
    generating the notch on the specimen by electrical discharge machining.

3. The treatment method according to claim 1, wherein the re-melt material layer is disposed on at least one of a root notch and a lateral side wall of the notch.

4. The treatment method according to claim 1, wherein the specimen has a square cross-sectional portion and the notch is located in a corner of the square cross-sectional portion.

5. The treatment method according to claim 1, wherein the step of placing a dam on the isolation layer comprises:
    forming a moldable cylinder.

6. The treatment method according to claim 1, wherein the step of selectively etching the notch comprises:
    applying the etching solution to the notch area to form the etched surface on the notch.

7. The treatment method according to claim 6, further comprising:
    removing the isolation layer and the dam from the specimen; and
    cleaning the specimen to remove the etching solution.

8. The treatment method according to claim 1, wherein at least a portion of the etched surface on the notch includes microcracks.

\* \* \* \* \*